United States Patent
Nomiya et al.

[11] Patent Number: 6,107,784
[45] Date of Patent: Aug. 22, 2000

[54] SYSTEM INTERCONNECTION PROTECTIVE DEVICE FOR NON-UTILITY GENERATION EQUIPMENT

[75] Inventors: Shigeo Nomiya, Funabashi; Chihiro Okado, Fuchu; Toyokuni Katoh, Tatsuno, all of Japan

[73] Assignees: Kabushiki Kaisha Toshiba, Kawasaki; Nishishiba Electric Co., Ltd., Himeji, both of Japan

[21] Appl. No.: 09/125,759

[22] PCT Filed: Dec. 26, 1997

[86] PCT No.: PCT/JP97/04907

§ 371 Date: Mar. 1, 1999

§ 102(e) Date: Mar. 1, 1999

[87] PCT Pub. No.: WO98/29933

PCT Pub. Date: Jul. 9, 1998

[30] Foreign Application Priority Data

Dec. 26, 1996 [JP] Japan .................................. 8-347357
Dec. 26, 1996 [JP] Japan .................................. 8-347359
Jan. 30, 1997 [JP] Japan .................................. 9-016949

[51] Int. Cl.⁷ ...................................................... G05F 1/70
[52] U.S. Cl. .......................... 323/205; 323/207; 307/87
[58] Field of Search .................................. 323/205, 206, 323/207, 208, 209, 210; 307/85, 86, 87

[56] References Cited

U.S. PATENT DOCUMENTS 4,878,208 10/1989 Seki et al. ............................ 323/207 X
5,798,633 8/1998 Larsen et al. ........................... 323/207
5,945,813 8/1999 Kondou et al. ......................... 323/205

FOREIGN PATENT DOCUMENTS 8-214562 8/1996 Japan .
9-135537 5/1997 Japan .
9-247863 9/1997 Japan .

Primary Examiner—Jessica Han
Attorney, Agent, or Firm—Finnegan, Henderson, Farabow, Garrett & Dunner, L.L.P.

[57] ABSTRACT

The isolation operation of a non-utility generation system (7) interconnected to a power system enable to be reliably detected in the non-utility generation system, providing a transfer breaker. When the frequency change rate of the non-utility generation system (7) has a positive value, the advanced reactive power of the non-utility generation system (7) is increased. When the frequency change rate of the non-utility generation system (7) has a negative value, the delayed reactive power of the non-utility generation system (7) is increased. Further, the gain of the power control section (9) of the non-utility generation system (7) is adjusted in accordance with the frequency change rate. As the gain is thus adjusted, the voltage of the non-utility generation system (7) changes. This change in the voltage is detected. In accordance with the voltage change, the non-utility generation system (7) is disconnected from the system power supply.

25 Claims, 25 Drawing Sheets

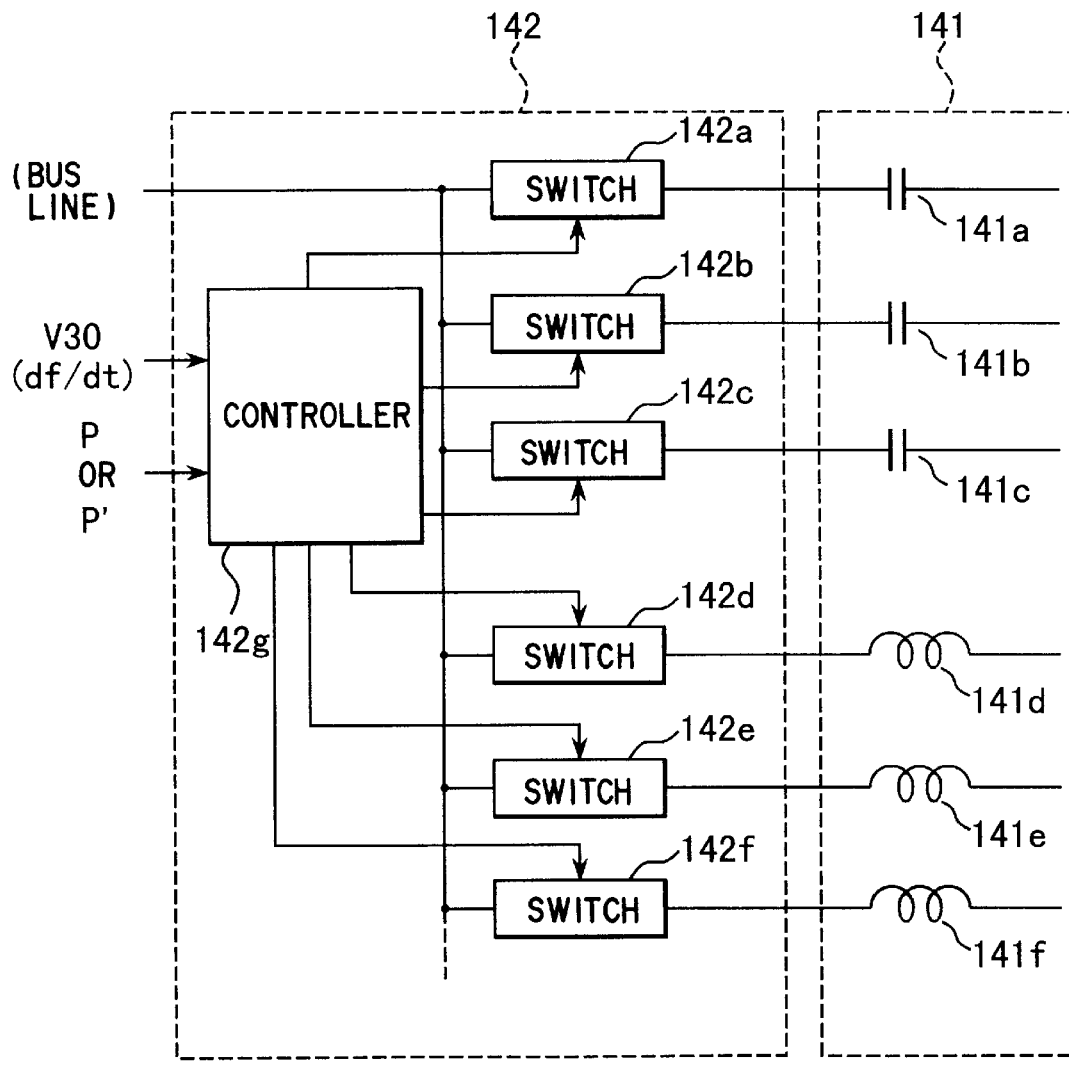
F I G. 24

SYSTEM INTERCONNECTION PROTECTIVE DEVICE FOR NON-UTILITY GENERATION EQUIPMENT

TECHNICAL FIELD

The present invention relates to an apparatus for protecting a non-utility generation system, such as a solid-waste burning generation system, a cogeneration system, a fuel battery system or a solar generation system, to be interconnected to a power system.

BACKGROUND ART

Hitherto, general users have been utilizing an interconnection system of the type shown in FIG. 1 to interconnect a power system and a non-utility generation system such as a cogeneration system. That is, in the upper substation 60, the transformer 2 lowers the voltage of the power system 1. The power with its voltage thus lowered is supplied via the breaker 3 to the houses of general users. In the house of any general user, the power is supplied through a breaker 4 to a load 5.

On the other hand, in the non-utility generation system, the breaker 6 connects the output of the AC generator 7 and the power system 1. The power output from the AC generator 7 is controlled by regulating the magnetic-field winding 8 of the AC generator by means of an automatic voltage regulator (AVR) 9. The output frequency of the AC generator 7 is controlled as a speed governor 11 adjusts the power of the engine 10, which drives the AC generator 7.

A fault-detecting means is provided. A rectifier 12 detects the output current of the generator 7. An error-detecting circuit 13 detects an anomalous current on the basis of the relationship between the output current and output voltage of the generator 7. The circuit 13 supplies an error signal to a fault trip circuit 20, which opens the breaker 6.

A protective means is provided. A rectifier 14 is connected to the output of the breaker 6 (namely, at the side of the substation 60), and an over-current relay (OC) 19 drives the fault trip circuit 20. When the power system 1 has a trouble, particularly when it is blocked because, for example, the breaker 3 opens, the output power of the AC generator 7 is supplied to the load 5. Consequently, the frequency and the voltage come to have an anomalous value. This event is detected by an under-frequency (UF) relay 15, an over-frequency (OF) relay 16, an over-voltage (OV) relay 17, an under-voltage (UV) relay 18, and the like. The fault trip circuit 20 receives the detection signals from these relays and generates a trip command to the breaker 6 and opens the breaker 6. Hence, the load 5 can be protected, and the breaker 3 can be closed again. When a trouble occurs in the power system 1, opening the breaker 3, the output power of the AC generator 7 and the power required by the load 5 may have each an active component and an idle component which are equal to each other. If this case, both the frequency and the voltage change little, and none of the relays 15 to 19 operate. Therefore, the generator 7 continues to operate, causing a so-called isolated operation (islanding). As a consequence, an accident may take place, possibly preventing the breaker 3 from being closed again.

For the purpose of preventing such an isolated operation, a transfer breaker 61 is connected by a leased line to the substation 60, for performing transfer breaking on the breaker 6. The transfer breaker 61 supplies a break signal to the breaker 6, thereby opening the breaker 6, when it detects a signal which indicates that breaker 3 is opened in the upper substation 60.

The transfer breaker 61 needs to be used if the upper substation 60 is very far or if many houses receive power from the substation 60. If used in a non-utility generation system of medium capacity, whose output is only hundreds of kilowatts, the transfer breaker will increase the cost very much, scarcely resulting in a practical advantage in system interconnection.

If the upper substation 60 is very far or if many houses receive power from the upper substation 60, the transfer breaker 61 must be used, because it does not much increase the cost of the entire power system and does results in a practical advantage in system interconnection.

However, if the transfer breaker 61 is provided in a non-utility generation system of medium capacity whose output is only hundreds of kilowatts, the cost will much increase. In such a non-utility generation system, it scarcely achieves a practical advantage in system interconnection.

The object of the present invention is to provide an apparatus for protecting a non-utility generation system to be interconnected to a power system, which can reliably detects the isolated operation of the non-utility generation system connected to a power system, without using a transfer breaker which is an expensive device.

DISCLOSURE OF INVENTION

The object described above can be attained by a apparatus for protecting a non-utility generation system to be interconnected a power system which is connected by a breaker to a power system and which has a voltage control system, said apparatus comprising:

a frequency detector for detecting an output frequency of the non-utility generation system;

a frequency-change rate detector for detecting a rate at which the frequency detected by the frequency detector changes;

arithmetic means for calculating a change reference for a voltage or reactive power output by the non-utility generation system, from the frequency change rate detected by the frequency-change rate detector;

first control means for increasing an advanced reactive power of the non-utility generation system or decreasing the output voltage of the non-utility generation system, when it is determined from the change reference that the frequency change rate has a positive value;

second control means for increasing a delayed reactive power of the non-utility generation system or increasing the output voltage of the non-utility generation system, when the frequency change rate has a negative value;

gain adjusting means for adjusting a gain of a power control section of the non-utility generation system, in accordance with the frequency change rate; and protecting means for detecting a frequency change, which increases as the voltage of the non-utility generation system changes, and for disconnecting the non-utility generation system from the system bus line in accordance with the frequency change detected. The above-mentioned object can achieved also by an apparatus for protecting an interconnection system of a non-utility generation system which is connected by a breaker to a power system, said apparatus comprising:

a frequency change detector for detecting changes in an output frequency of the non-utility generation system;

control means for outputting a control signal to the non-utility generation system, thereby to control a reactive power, a preset output voltage, an output voltage, an output voltage phase or an output current phase of the non-utility generation system;

reactive power-change rate detector for detecting a rate at which a reactive power of the non-utility generation system changes;

voltage-change rate detecting means for detecting a rate at which an output-voltage reference of the non-utility generation system changes;

frequency-change increasing means for changing an output of the non-utility generation system, thereby to increase the frequency change, when the reactive power-change rate detecting means and the voltage-change rate detecting means detect a change in the frequency of the non-utility generation system; and operating mode setting means for setting an operating mode of the non-utility generation system when the reactive power-change rate decreases as the frequency-change increasing means increases the frequency change.

Further, the object described above can be attained by an apparatus for protecting a non-utility generation system which is connected by a breaker to a power system and which has a voltage control system, said apparatus comprising:

a frequency detector for detecting an output frequency of the non-utility generation system;

a frequency-change rate detector for detecting a rate at which the frequency detected by the frequency detector changes;

low-speed response reactive power control means for detecting a reactive power of the non-utility generation system, said low-speed response reactive power control means being controlled by a first voltage reference to change the reactive power to a desired value;

high-speed response reactive power control means controlled by a reactive-power change reference and a second voltage change, said reactive-power change reference advancing the reactive power when said frequency-change rate detector detects that the frequency change rate has a positive value, and delaying the reactive power when said frequency-change rate detector detects that the frequency change rate has a negative value, and said second voltage change having been obtained by comparing the reactive power and the reactive power change;

voltage control means for controlling an output voltage of the non-utility generation system in accordance with a third voltage reference obtained from the first voltage reference for controlling the low-speed response reactive power control means and the second voltage reference for controlling the high-speed response reactive power control means; and protective means for disconnecting the non-utility generation system from a bus line in accordance with the reactive power change and also with the second voltage reference for controlling the high-speed response reactive power control means.

Still further, the object described above can be achieved by an a apparatus for protecting an interconnection system of a non-utility generation system which is connected by a breaker to a power system, said apparatus comprising:

a frequency detector for detecting an output frequency of the non-utility generation system;

a frequency-change rate detector for detecting a rate at which the frequency detected by the frequency detector changes;

a function circuit for calculating a voltage-change reference from the frequency change rate detected by the frequency-change rate detector and for controlling the non-utility generation system to increase an advanced reactive power of the non-utility generation system or decrease the output voltage of the non-utility generation system when it is determined from the voltage change reference that the frequency change rate has a positive value, and to increase a delayed reactive power of the non-utility generation system or increase the output voltage of the non-utility generation system when it is determined from the voltage change reference that the frequency change rate has a negative value;

an active power detector for detecting an active power of the non-utility generation system;

voltage-change reference correcting means for increasing the voltage-change reference output from the function circuit, thereby to sufficiently increase the output frequency of the non-utility generation system when the active power detected by the active power detector is small; and a protective device for detecting a frequency change increasing as the voltage of the non-utility generation system changes and for disconnecting the non-utility generation system from a bus line.

Moreover, the above-mentioned object can be achieved by an apparatus for protecting an interconnection system of a non-utility generation system which is connected by a breaker to a power system, said apparatus comprising:

a frequency detector for detecting an output frequency of the non-utility generation system;

a frequency-change rate detector for detecting a rate at which the frequency detected by the frequency detector changes;

a group of capacitors which are power capacitors;

input breaker means for disconnecting the group of capacitors from the non-utility generation system when the frequency change rate detected by the frequency-change rate detector has a positive value and connecting the group of capacitors to the non-utility generation system when the frequency change rate detected by the frequency-change rate detector has a negative value; and a protective device for detecting a frequency change increased as the reactive power changes when the group of capacitors is connected or disconnected, and for disconnecting the non-utility generation system from a base line in accordance with the frequency change detected.

Furthermore, the above-mentioned object can be attained by an apparatus for protecting a non-utility generation system which is connected by a breaker to a power system, said apparatus comprising:

a frequency detector for detecting an output frequency of the non-utility generation system;

a frequency-change rate detector for detecting a rate at which the frequency detected by the frequency detector changes;

a function circuit for calculating a voltage-change reference from the frequency change rate detected by the frequency-change rate detector and for controlling the non-utility generation system to increase an advanced reactive power of the non-utility generation system or decrease the output voltage of the non-utility generation system when it is determined from the voltage change reference that the frequency change rate has a positive value, and to increase a delayed reactive power of the non-utility generation system or increase the output voltage of the nonutility generation system when it is determined from the voltage change reference that the frequency change rate has a negative value;

a group of capacitors which are power capacitors, input breaker means for disconnecting the group of capacitors from the non-utility generation system when the frequency change rate detected by the frequency-change rate detector has a positive value and connecting the group of capacitors to the non-utility generation system when the frequency change rate detected by the frequency-change rate detector has a negative value; and a protective device for detecting a frequency change increased as the reactive power changes when the group of capacitors is connected or disconnected, and for disconnecting the non-utility generation system from a base line in accordance with the frequency change detected.

BRIEF DESCRIPTION OF THE DRAWINGS

FIG. 24 is a diagram supplemental to the block diagram of an eighteenth embodiment of the invention;

BEST MODE OF CARRYING OUT THE INVENTION (First Embodiment)
(Structure)

Figure 1:
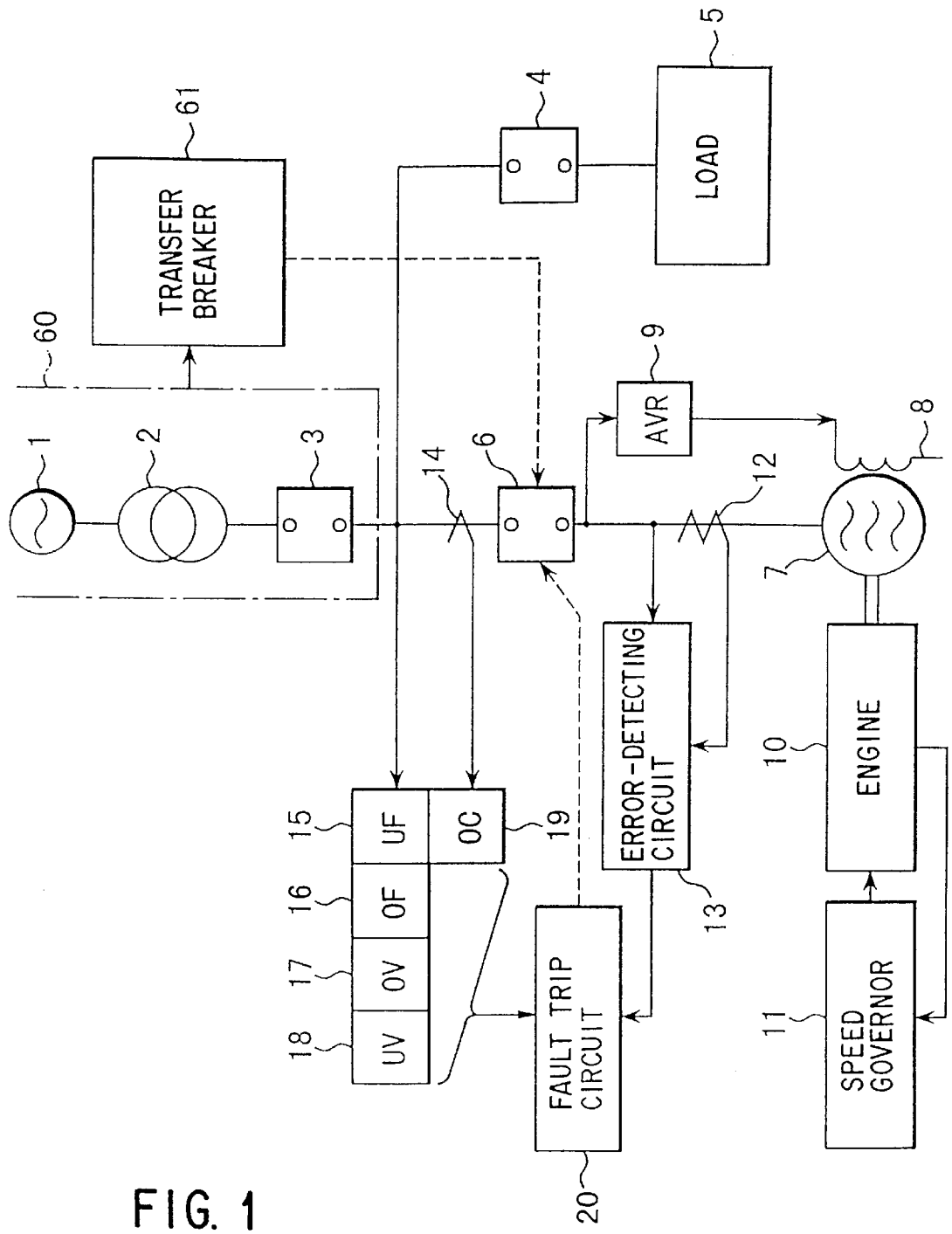
FIG. 1 is a block diagram showing a conventional apparatus for protecting a non-utility generation system.
Figure 2:
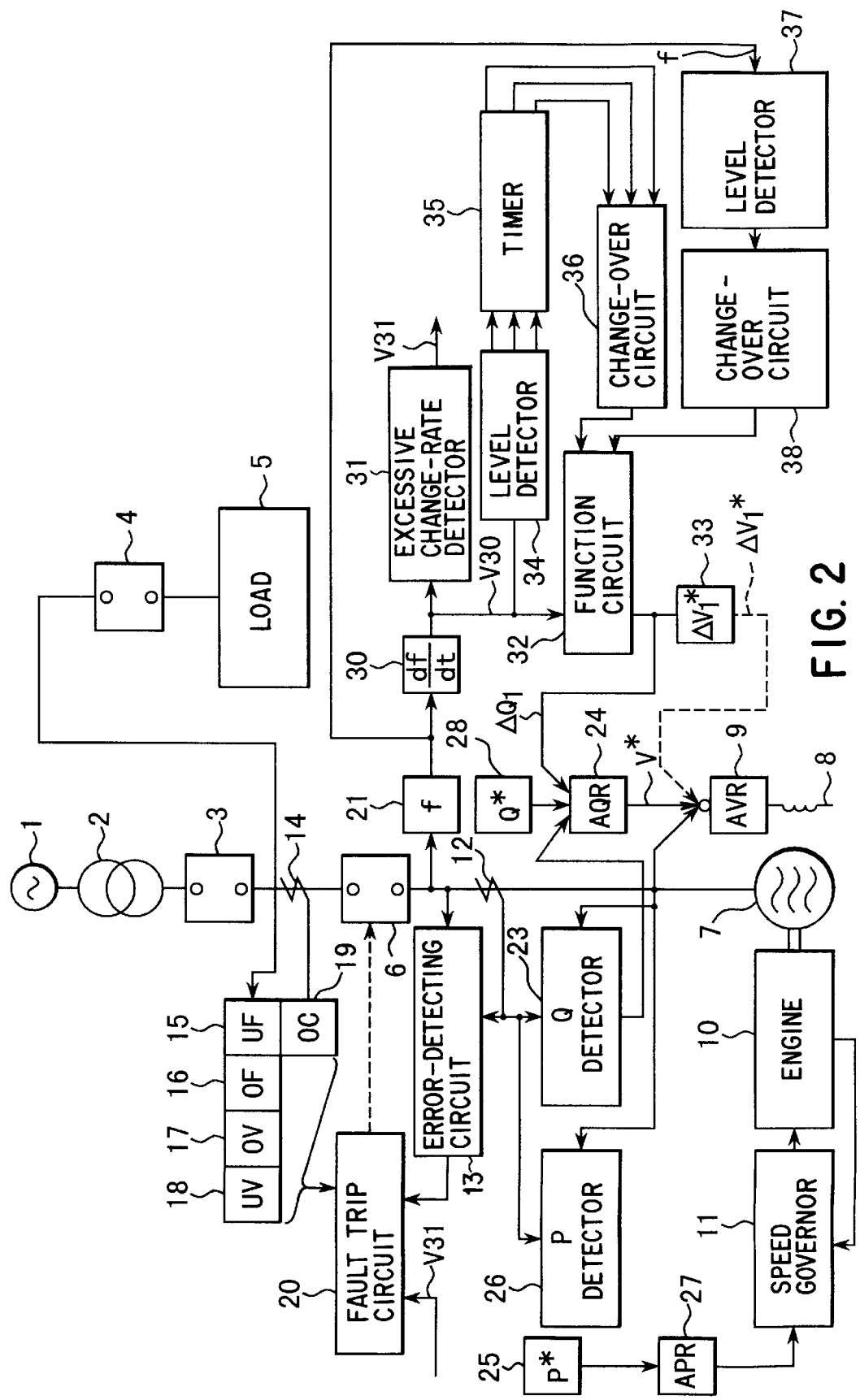
FIG. 2 is a block diagram showing an apparatus for protecting a non-utility of generation system, which is a first embodiment of the present invention.

FIG. 2 is a block diagram showing the first embodiment of the present invention. It differs from the conventional system (FIG. 1) for protecting a non-utility generation system, in that it is constructed as will be described below, not having a transfer breaker 38 which is an expensive device.

As shown in FIG. 2, a frequency detector 21 detects a frequency (f) from the output voltage of an AC generator 7 that is a non-utility generation system of revolving-armature type. From the frequency thus detected, a frequency-change rate detector 30 detects a rate (df/dt) of change in the frequency. An excessive change-rate detector 31 detects whether the rate $V_{30}$ of change in the frequency has exceeded a preset value. Upon detecting that the rate $V_{30}$ has exceeded the preset value, the detector 31 outputs an error signal $V_{31}$. The error signal $V_{31}$ is supplied to a fault trip circuit 20. The fault trip circuit 20 gives a trip to a breaker 6, opening the electric circuit.

A reactive power detector 23 receives the output current of the generator 7 which a current transformer 12 has detected, and also receives the output voltage of the generator 7. The detector 23 detects a reactive power. Meanwhile, an active power detector 26 receives the output current of the generator 7 which the transformer 12 has detected, and also receives the output voltage of the generator 7, and detects an active power.

An active power regulator (APR) 27 compares the active power reference P* set by an active power reference (P*) setting device 25 with the active power P detected by the active power detector 26. The difference between the active power reference and the active power is supplied to a speed governor 11, which controls the speed of an engine 10.

Figure 5:
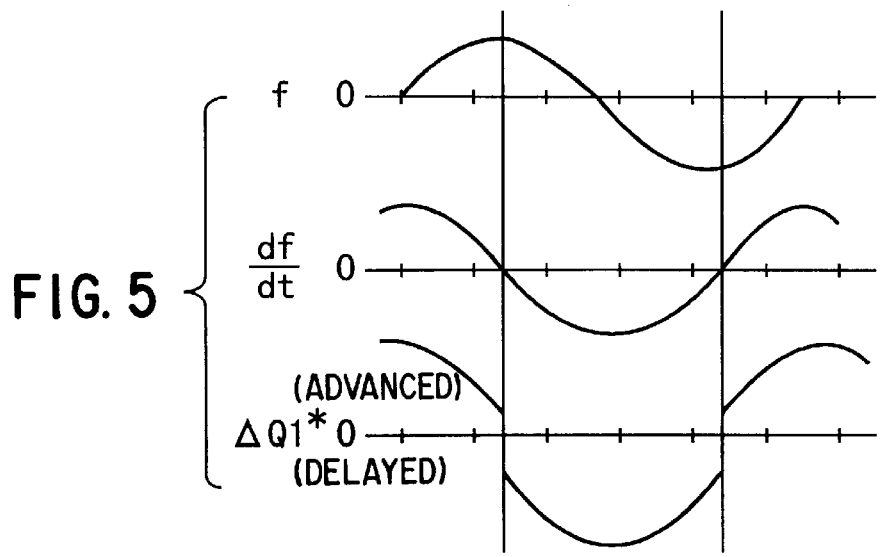
FIG. 5 is a diagram explaining the operation of the embodiment shown in FIG. 2.

A function circuit 32 is designed to receive a rate $V_{30}$ of change in the frequency from the frequency-change rate detector 30 and to output a reactive-power change reference $\Delta Q_1^*$. More specifically, as shown in FIG. 5, the reactive-power change reference $\Delta Q_1^*$ causes the advanced reactive power to increase while the frequency change rate df/dt is increasing, thereby to promote an increase in the frequency. Further the reference $\Delta Q_1^*$ causes the delayed reactive power to increase while the change rate df/dt is decreasing, thereby to promote a decrease in the frequency.

A reactive power regulator (AQR) 24 outputs a voltage reference V* for equalizing the reactive power Q detected by the reactive power detector 23 and a new reactive power reference that is the sum of the reactive power Q* supplied from a reactive power reference (Q*) setting device 28 and the reactive-power change reference $\Delta Q_1^*$ supplied from the function circuit 32.

An automatic voltage regulator (AVR) 9 receives the voltage reference V* from the reactive power regulator (AQR) 24 and gives a field magnet command to a field magnet winding 8, thereby to control the output voltage of the generator 7.

The active power reference setting device 25, active power regulator (APR) 27, speed governor 11 and engine 10 constitute a speed control loop. The reactive power reference (Q*) setting device 28, reactive power detector 23 and reactive power regulator (AQR) 24 constitute a reactive power control loop. The voltage reference V*, which is the output of the reactive power regulator (AQR) 24, and the automatic voltage regulator (AVR) 9 constitute a voltage control loop.

A level detector 34 detects a plurality of levels from the frequency change rate $V_{30}$. A circuit 36 changes over the function in the function circuit 32 after a timer 35 has detected the level, only for a time.

A level detector 37 detects whether or not the frequency detected by the frequency detector 21 has changed from the rated value. If the detector 37 detects this, a changeover circuit 38 operates to decrease the gain of the function circuit 32.

(Operation)

Figure 3:
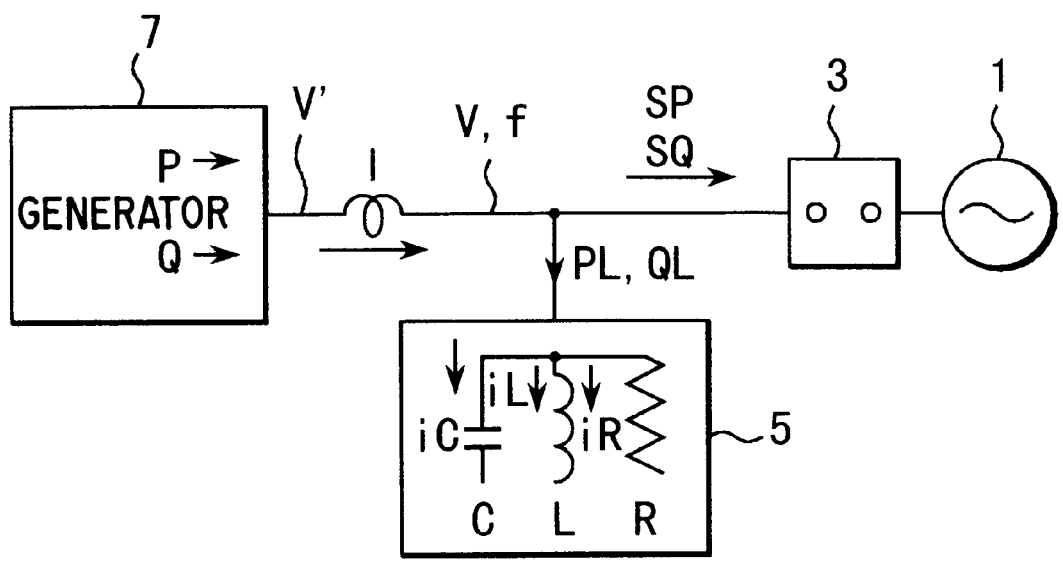
FIG. 3 is a diagram to the block diagram of the embodiment shown in FIG. 2.

The basic operation of the first embodiment described above will be explained, with reference to FIGS. 3 to 6. The active power SP and reactive power SQ, both supplied to a power system 1 are given as follows:

$SP = P - P_L$ $SQ = Q - Q_L$ where P is the active power output by the generator 7, Q is the reactive power, $P_L$ is the active power a load 5 needs, $Q_L$ is the reactive power, as is shown in FIG. 3.

Here, I is the inductance I between the generator 7 and the system, V is the voltage applied on the load 5, and f is the frequency.

In most cases, the voltage V on the load 5 and the frequency f scarcely change even if a breaker 3 is opened while SP and SQ are almost zero (0). Thus, relays 15 to 19 are not detected, an isolated operation continues.

However, the phase of the power system 1 and the phase of the load 5 gradually deviate from each other. If the breaker 3 is closed again, a great accident may arise. Hence, the breaker 3 cannot be closed again. This will impair the safety operation of the power distribution system.

The voltage during the isolated operation is determined as $P = V^2/R$. On the other hand, the frequency f during the isolated operation is determined by $Q = (V^2 \omega C) - (V^2/\omega L)$. The frequency f, in particular, increases when the reactive power the generator 7 supplies advances with respect to the reactive power $Q_L$ the load 5 needs. In this case, the current $i_C$ in a capacitor C increases and the inductance current $i_L$ decreases, whereby the reactive power changes to become balanced.

When the reactive power the generator 7 supplies delays with respect to the reactive power $Q_L$ the load 5 needs, the frequency f decreases and the inductance current $i_C$ increases. The capacitor current $i_C$ therefore decreases, and the reactive power becomes balanced.

Figure 4:
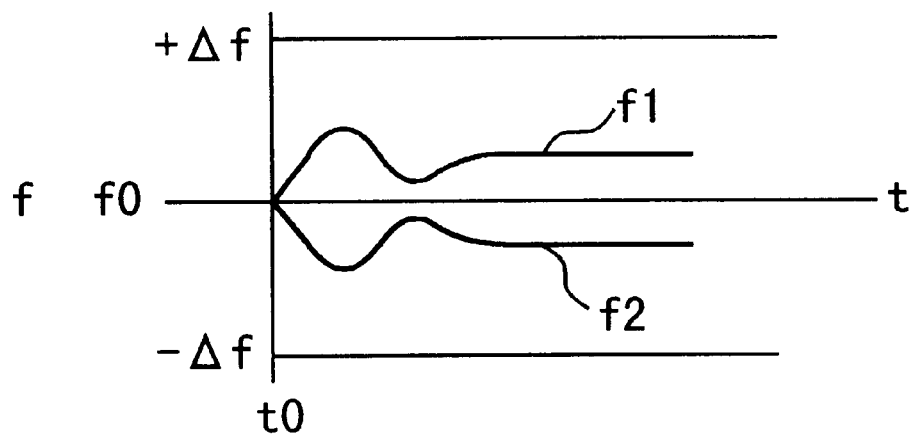
FIG. 4 is a graph explaining the operation of the embodiment shown in FIG. 2.

When the isolated operation starts while SP=0 and SQ≠0, the frequency f approaches either $f_1$ or $f_2$ while changing, as shown in FIG. 4, after the system has been disconnected ($t_0$), as has been actually observed and confirmed by simulation.

In FIG. 4, $f_1$ is the value the frequency f has when SQ is advanced a little, and $f_2$ is the value the frequency f has when SQ is delayed a little. +Δf and −Δf, both shown in FIG. 4, are levels at which the relays 15 to 19 can detect isolated operation.

FIG. 5 is a diagram explaining the operational advantage of the embodiment shown in FIG. 2. In FIG. 5, f is the frequency the frequency detector 21 has detected, df/dt is the frequency change rate the frequency-change rate detector 30 has detected, and $\Delta Q_1^*$ is the output of the function circuit 32.

If f changes as shown in FIG. 5, df/dt will have a waveform, which advances in phase by 90°.

Figure 6:
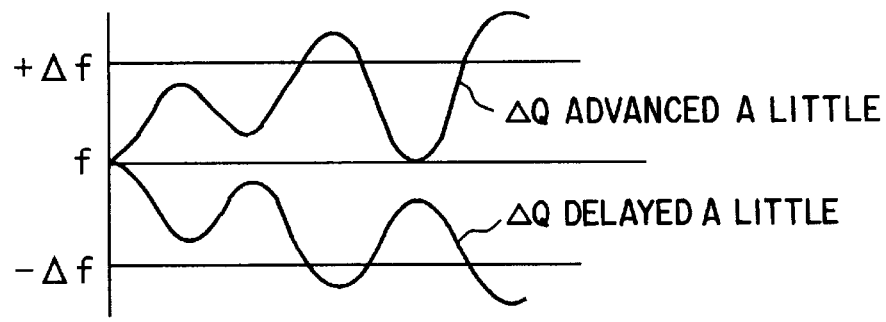
FIG. 6 is a diagram explaining the operation of the embodiment shown in FIG. 2.

When df/dt>0, the frequency is increasing. In this case, the function circuit 32 outputs $\Delta Q_1^*$ which is advanced, and the frequency f further increases. When df/dt<0, the frequency f is decreasing. In this case, the function circuit 32 outputs $\Delta Q_1^*$ which is delayed, and the frequency f further decreases. This positive feedback operation increases the rate of frequency change as is illustrated in FIG. 6, and the excessive change-rate detector 31 detects an anomalous frequency or an excessive rate of frequency change. This makes it possible to detect the isolated operation and protect the system, without using a transfer breaker (e.g. breaker 61 shown in FIG. 1) which is incorporated in the conventional system and which is an expensive device.

The basic operation has been explained. Once the isolated operation has started while SP=0 and SQ=0, it takes some time until the change in the frequency is enhanced through the positive feedback. In some cases, it may difficult to detect the isolated operation within three seconds or less after the circuit is closed again.

In order to shorten this time, the gain of the function circuit 32 is increased in the present invention, thereby increasing the positive feedback value. Despite of the scheme, it remains possible that the change in a change in df/dt which occurs while the generation system remains connected with the system power supply in normal state may trigger an excessive change in the reactive power.

Figure 7:
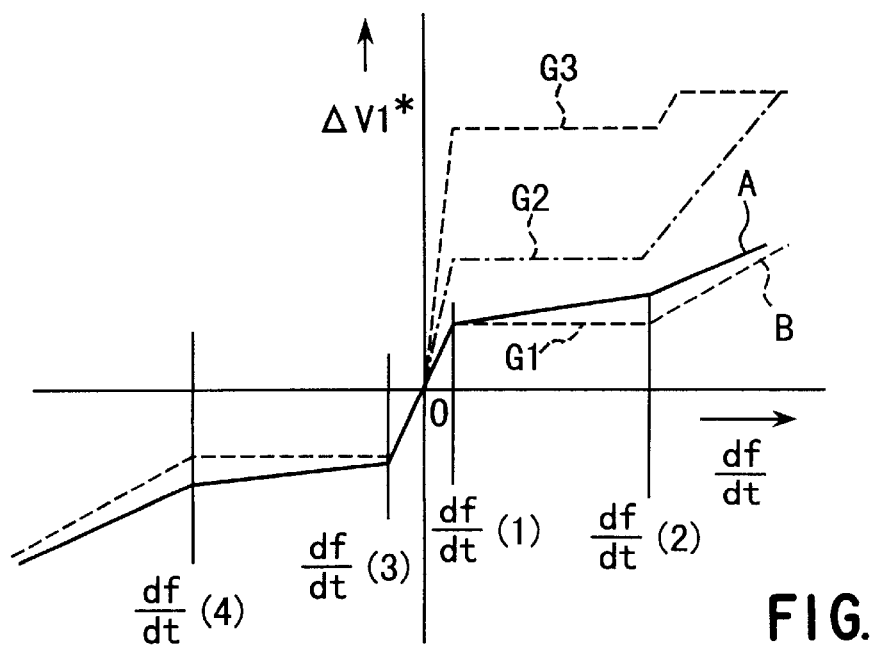
FIG. 7 is a characteristic diagram illustrating the operation of the function circuit shown in FIG. 2.

To solve this problem, the function circuit 32 shown in FIG. 2 has, for example, a special function A shown in FIG. 7.

Namely, when the isolated operation starts while SQ=0, df/dt is extremely small in the initial phase, falling within a range from df/dt(1) to df/dt(3). A voltage-change reference $V_1^*$ that has increased the gain within this range is output, thereby increasing the positive feedback value. The voltage-change reference $\Delta V_1^*$ works as a kind of a trigger signal.

The frequency change rate df/dt(2) is at a value close to the maximum value which df/dt may have while the generation system remains connected to the system power supply. The gain is decreased for the range from df/dt(1) to df/dt(2) (or $\Delta V_1^*$ is limited, setting a function B), thereby preventing an excessive change in the reactive power (an excessive voltage change). The gain increases again if df/dt falls outside the range from df/dt(2) to df/dt(4). The change in the frequency is thereby increased during the isolated operation. Minor characteristics such as A and B may be varied in accordance with the condition of the system.

(Advantages)

As described above, the first embodiment of the invention can provide an apparatus for protecting a non-utility generation system, which performs a stable operation at high speed and in which a trigger signal having a substantially constant value $\Delta V_1^*$ is used, shortening the time required to detect isolated operation and suppressing the change in the voltage of the interconnection system.

(Second Embodiment)

A possible isolated operation is detected if the change rate df/dt the level detector 34 (FIG. 2) has detected is small. When the rate df/dt reaches the first level, the changeover circuit 36 increases the gain of the function circuit 32 and the gain is monitored, only for the time by the timer 35. For example, the gain is increased from characteristic $G_1$ to characteristic $G_2$, both shown in FIG. 7, and is monitored. When the level detector 34 detects that the gain reaches the second level, the gain is further increased from $G_2$ to $G_3$, both shown in FIG. 7, for the time preset by the timer 35. Thus, the isolated operation can be fast detected and, in addition, the gain can be prevented from become excessive even if the rage in change of the system frequency increases to excess due to an accident. The system can therefore remain stable. The gain recovers to $G_1$, by virtue of the timer 35, when the system frequency ceases to change.

This control of the gain can be accomplished, achieving the same effect, also by varying the voltage-change reference $\Delta V_1^*$.

(Third Embodiment)

In the generation system shown in FIG. 2, when the change in the frequency becomes excessively large during the isolated operation, the electric devices, such as the electric motor, connected to the load may have a trouble. To prevent such a trouble, the level detector 37 detects whether the frequency f is excessively large or excessively small, and the changeover circuit 38 decreases the gain of the function circuit 32 and the output limit is reduced. The positive feedback value is thereby decreased, suppressing the change in the frequency. This enhances the reliability and safety of the apparatus.

(Fourth Embodiment)

When the load 5 shown in FIG. 2 undergoes isolated operation, in which the ratio of the motor to the load is high, the change P in active power and the change Q are small in comparison with the change V in the output voltage of the generator. Hence, there is the trend that the rate df/dt of frequency change would not increase.

Figure 8:
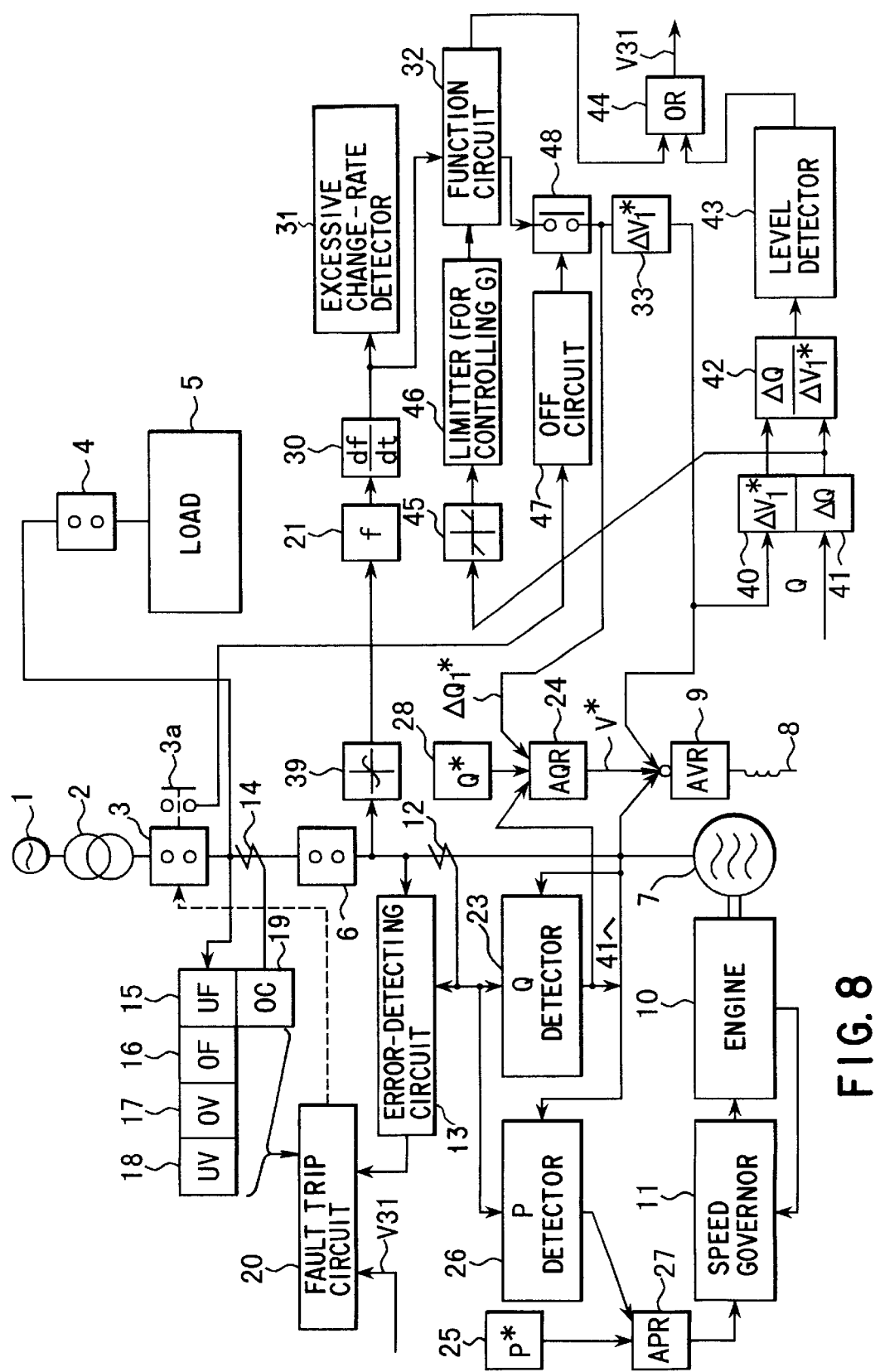
FIG. 8 is a block diagram showing an apparatus for protecting a non-utility generation system, which is a seventh or eighth embodiment of the present invention.

If this is the case, the apparatus may be modified to one shown in FIG. 8. The apparatus shown in FIG. 4 differs from the apparatus of FIG. 2 in that a voltage-change reference ($\Delta V_1^*$) detecting circuit 42, a reactive power change ($\Delta Q$) detecting circuit 41, a $\Delta Q/\Delta V_1^*$ detecting circuit 42, a level detector 43 and an OR circuit (logic sum circuit) 44 are additionally provided.

No components equivalent to the level detectors 34 and 37 and timer 35, level detectors 36 and 38 are not shown in FIG. 8. In practice, however, the level detectors 34 and 37 and timer 35, level detectors 36 and 38 may be required in many cases.

The voltage-change reference detecting circuit 40 detects $\Delta V_1^*$, and the reactive power change detecting circuit 41 detects $\Delta Q$. These values $\Delta V_1^*$ and $\Delta Q$ are input to the $\Delta Q/\Delta V_1^*$ detecting circuit 42. The circuit 42 detects the ratio of $\Delta Q$ to $\Delta V_1^*$. The ratio $\Delta Q/\Delta V_1^*$ detected by the $\Delta Q/\Delta V_1^*$ detecting circuit 42 is input to the level detector 43. The level detector 43 detects that the ratio $\Delta Q/\Delta V_1^*$ has decreased. That is, the detector 43 detects the isolated operation. The output of the detector 43 is supplied via the OR circuit 44 to the fault trip circuit 20, thereby disconnecting the generator 7 from the system. Alternatively, the output of the excessive change-rate detector 31 is supplied via the OR circuit 44 to the fault trip circuit 20, thereby disconnecting the generator 7 from the system. As long as the apparatus is connected to the generation system, the power supply impedance is low. The ratio $\Delta Q/\Delta V_1^*$ is therefore large, but becomes small particularly when the load on the electric motor is great during the isolated operation. This event is utilized in the apparatus.

Needless to say, the change $\Delta V$ in the output voltage of the generator may be used in place of the voltage-change reference $\Delta V_1^*$ shown in FIG. 8. In this case, the apparatus operates in exactly the same way.

(Fifth Embodiment)

The fifth embodiment differs from the fourth embodiment in that an excessive change detecting circuit 45 and a gain control (limit) circuit 46 are additionally provided as shown in FIG. 8. When the excessive change detecting circuit 45 detects that the output the reactive power change detecting circuit 41 detects $\Delta Q$ of the reactive power change detecting circuit 41 has exceeded the preset value, the gain control (limit) circuit 46 decreases the gain of the function circuit 32 or limits the output thereof. The change in the voltage-change reference $\Delta V_1^*$ is thereby suppressed. As a result, the change in the reactive power is limited.

The apparatus operates in almost the same way if $\Delta Q/\Delta t$ is detected, instead of using the reactive power change detecting circuit 41.

(Sixth Embodiment)

The sixth embodiment differs from the fourth and fifth embodiments in that an off circuit 47, a switch circuit 48 and an auxiliary contact 3a are additionally provided as shown in FIG. 8. The isolated operation is detected at the auxiliary contact 3a, thus determining that the breaker 3 has been opened. The switch circuit 48 connected in series between the output of the voltage-change reference setting device 33 and the input of an automatic voltage regulator 9 is thereby opened, opening the positive feedback circuit. The breaker 3 is opened and disconnected from the system power supply from the system. At the same time, the positive feedback loop is opened, constituting a stable voltage control loop. The generator 7 can be used as an independent power supply.

(Seventh Embodiment)

The seventh embodiment differs from the fourth to sixth embodiments in that a phase-characterizing circuit 39 is additionally provided as shown in FIG. 8. More specifically, the circuit 39 is connected between the input of the frequency detector 21 and one end of the breaker 6. The phase-characterizing circuit 39 is designed to advance the phase as the frequency increases, as long as the frequency remains in the vicinity of its rated value. Its characteristic is represented by plotting the frequency and the phase on the abscissa and the ordinate, respectively.

Hence, the circuit 39 can detect frequency changes in a magnified form, thus promoting the positive feedback in the vicinity of the rated frequency and shortening the time required to detect the isolated operation. When the frequency changes more greatly, the phase characteristic is inverted, automatically suppressing the positive feedback. An excessive change in the frequency can thereby be prevented. Needless to say, the phase-characterizing circuit 39 thus designed can perform software process after it has detected the frequency f.

(Eighth Embodiment)

Figure 9:
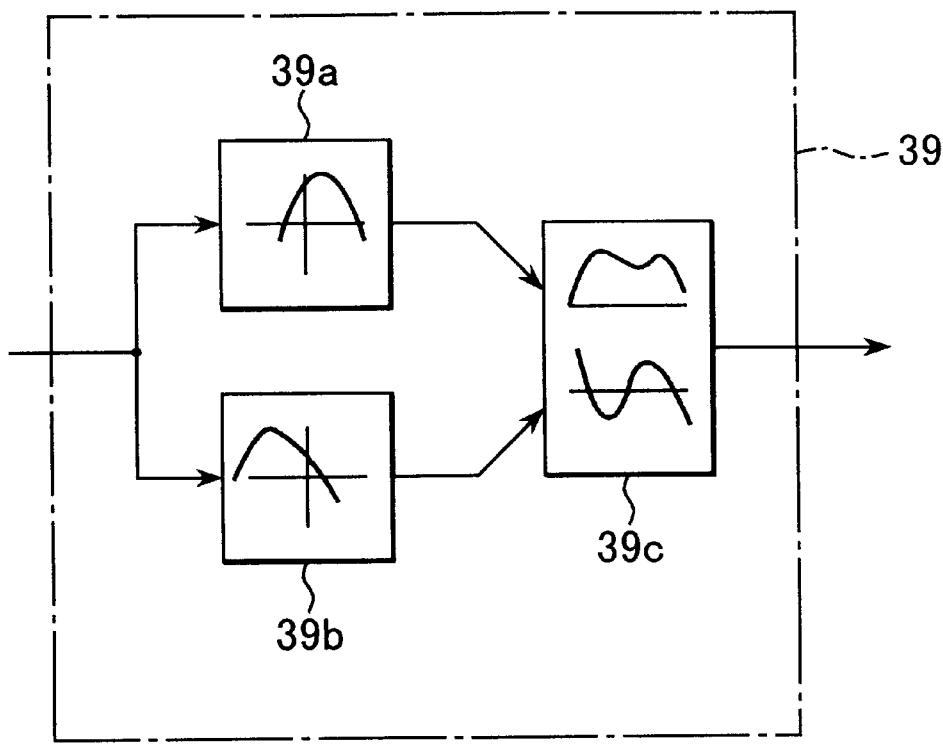
FIG. 9 is a diagram showing the phase circuit shown in FIG. 8.

The phase characterizing circuit 39 shown in FIG. 8 comprises band-pass filters 391 and 392 and an adder circuit 393 as illustrated in FIG. 9. The band-pass filter 391 has a resonance point at a frequency slightly higher than the rated frequency. The band-pass filter 392 has a resonance point at a frequency slightly lower than the rated frequency. The adder circuit 393 adds the outputs of the band-pass filters 391 and 392. Thus constructed, the circuit 39 has the gain characteristic and the phase characteristic, which are shown in the upper and lower parts of FIG. 9.

The phase characterizing circuit 39 can be provided at the output of the frequency detector 21 by means of software.

(Ninth Embodiment)

Figure 10:
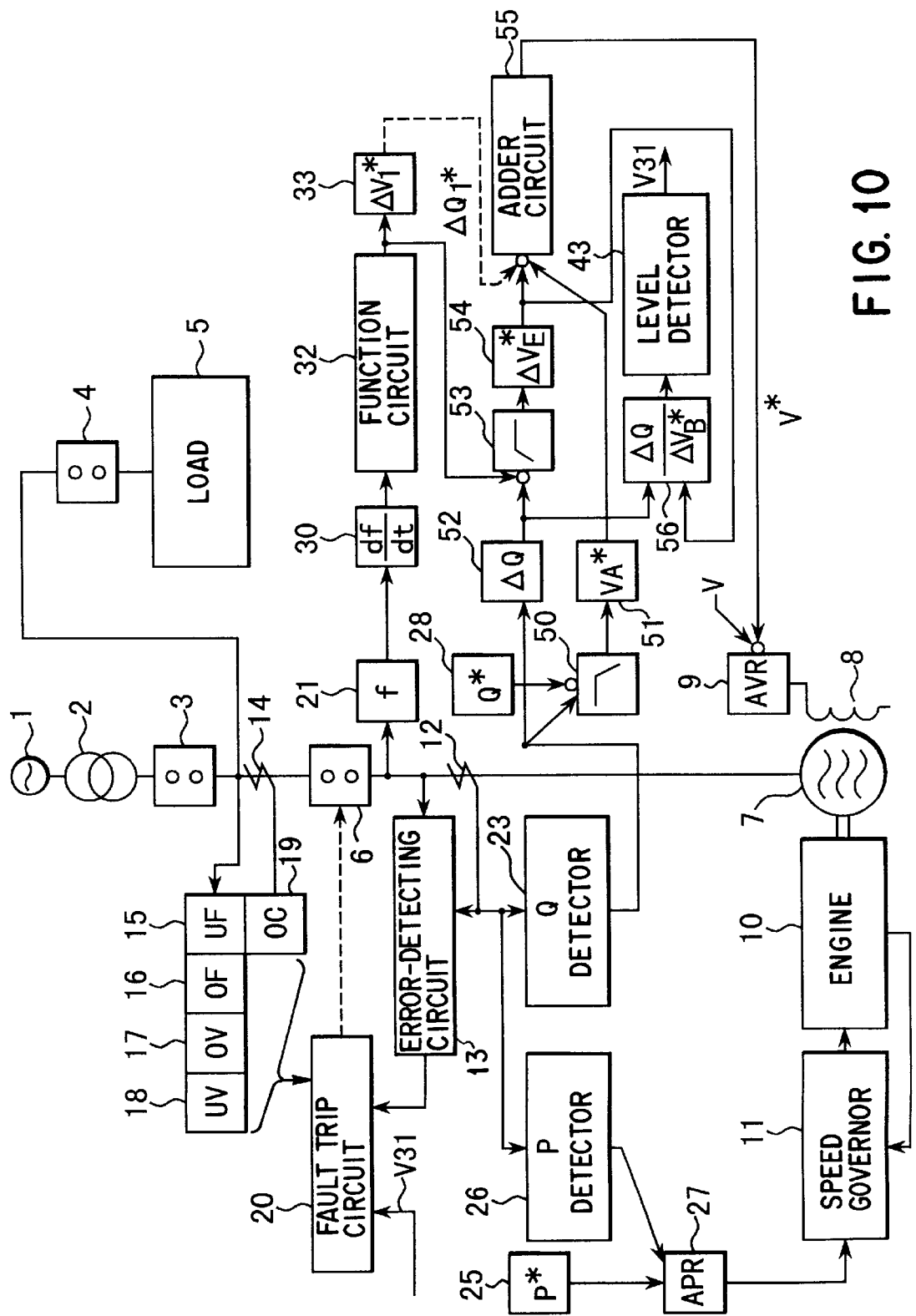
FIG. 10 is a block diagram showing an apparatus for protecting a non-utility generation system, which is a ninth or tenth embodiment of the present invention.

The ninth embodiment differs from the embodiment of FIG. 2 in that the reactive power regulator 24 is replaced by a low-speed response reactive power control circuit 50, a voltage reference ($V_A^*$) setting device 51, a $\Delta Q$ detecting circuit 52, a high-response reactive power control circuit 53, a voltage-change reference ($\Delta V_B^*$) setting device 54, an adder circuit 55 and a $\Delta Q/\Delta V_B^*$ detector 56, as is illustrated in FIG. 10. Although the level shifters 34 and 37, timer 35 and change-over circuits 36 and 38 are not shown in FIG. 10, these components may be required in many cases.

In this embodiment, the outputs of the reactive power reference setting device 28 and reactive power detector 23 are compared, and the difference between the outputs is input to the low-speed response reactive power control circuit 50. The low-speed response reactive power control circuit 50 generates an output only when the frequency is in a low range. This is because its gain is large when the frequency is in the low range. As a result, the voltage reference setting device 51 outputs a voltage reference ($V_A^*$) which will control the reactive power for about tens of seconds. The voltage reference is input to one input terminal of the adder circuit 55.

Meanwhile, the output of the reactive power detector 23 is input to the reactive-power change detecting circuit 52. The circuit 52 detects a change in the reactive power. The change in the reactive power is compared with the output of the function circuit 32. The difference between the values compared is input to the high-response reactive power control circuit 53.

The high-response reactive power control circuit 53 has a large gain only when the frequency is in a high range. Therefore, it generates an output only when the frequency is in the high range. The voltage-change reference ($\Delta V_B^*$) setting device 54 generates an output $\Delta V_B^*$. The output $\Delta V_B^*$ is input to the other input terminal of the adder circuit 55 to control the reactive power for about 0.5 seconds.

The adder circuit 55 adds the voltage-change reference $\Delta V_B^*$ and the voltage reference $V_A^*$, thus generating a voltage chance reference $\Delta V_1^*$. The voltage chance reference $\Delta V_1^*$ is compared with the change V in the output voltage of the generator. The difference between the values compared is input to the automatic voltage regulator 9.

The reactive power change output from the reactive-power change detecting circuit 52 and the voltage-change reference $\Delta V_B^*$ output from the voltage-change reference setting device 54 are input to the $\Delta Q/\Delta V_B^*$ detector 56. The ratio of $\Delta Q$ to $\Delta V_B^*$ ($\Delta Q/\Delta V_B^*$) is input to the level detector 43. When the level detector 43 detects that the ratio $\Delta Q/\Delta V_B^*$ has decreased, or detects the isolated operation, it generates an output $V_{31}$. This output, or a trip command, is supplied to the fault trip circuit 20. Hence, while the generation system remains interconnected to the system power supply, $\Delta Q$ can be controlled at high speed in accordance with $\Delta Q_1^*$. $\Delta Q$ changes very little during the isolated operation particularly when the load on the electric motor is small. Therefore, $\Delta Q$ scarcely changes even if $\Delta V_B^*$ changes greatly. This makes it possible to detect the isolated operation by detecting a decrease in the ratio $\Delta Q/\Delta V_B^*$.

(Tenth Embodiment)

In the ninth embodiment described above, the voltage-change reference ($\Delta V_1^*$) setting device 33 is not provided at the output of the function circuit 32. In the tenth embodiment, the voltage-change reference setting device 33 is provided and the voltage-change reference $\Delta V_1^*$ is supplied to an input terminal of the adder circuit 55.

While the generation system remains interconnected to the system power supply, $\Delta V_1^*$ is fed forward and $\Delta V_B^*$ is applied in a feedback loop to control the change in reactive power. When $\Delta Q$ becomes zero (0) during the isolated operation in which mainly the load on the motor is driven, $\Delta V_B^*$ and $\Delta V_1^*$ are added, increasing $\Delta Q$. In this case, $\Delta Q/\Delta V_B^*$ decreases.

(Eleventh Embodiment)

Figure 11:
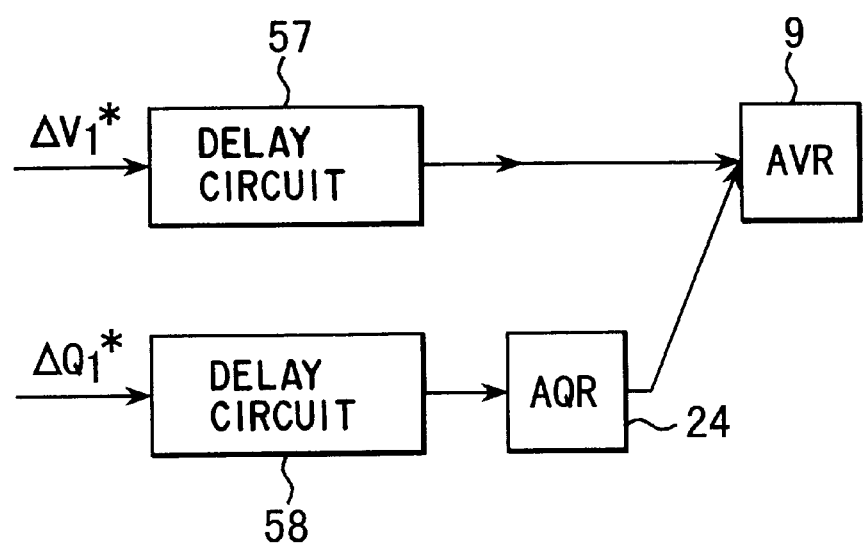
FIG. 11 is a block diagram depicting only one part of an apparatus for protecting a non-utility generation system, which is an eleventh embodiment of the present invention.

The generation system incorporated in the embodiments described above may be either a rotary machine such as an AC generator or a static system such as an inverter or an SVC (Static Var Compensator). In practice, both types of generation systems are used together. The control of a rotary machine is delayed by about 0.5 seconds due to the response time of the field magnet. A static system responds very fast; its response time is negligibly short. To use both types of generation systems, it is therefore necessary to delay the control of the static system, thereby to operate the static system in synchronism with the rotary machine. Thus, as shown in FIG. 11, a delay circuit 57 delays $\Delta V_1^*$, thereby providing a voltage-change reference, and a delay circuit 58 delays $\Delta Q_1^*$, thereby providing a reactive-power change reference, which is supplied through the reactive power regulator 24. This makes it possible to use a static converter.

(Twelfth Embodiment)
(Structure)

Figure 12:
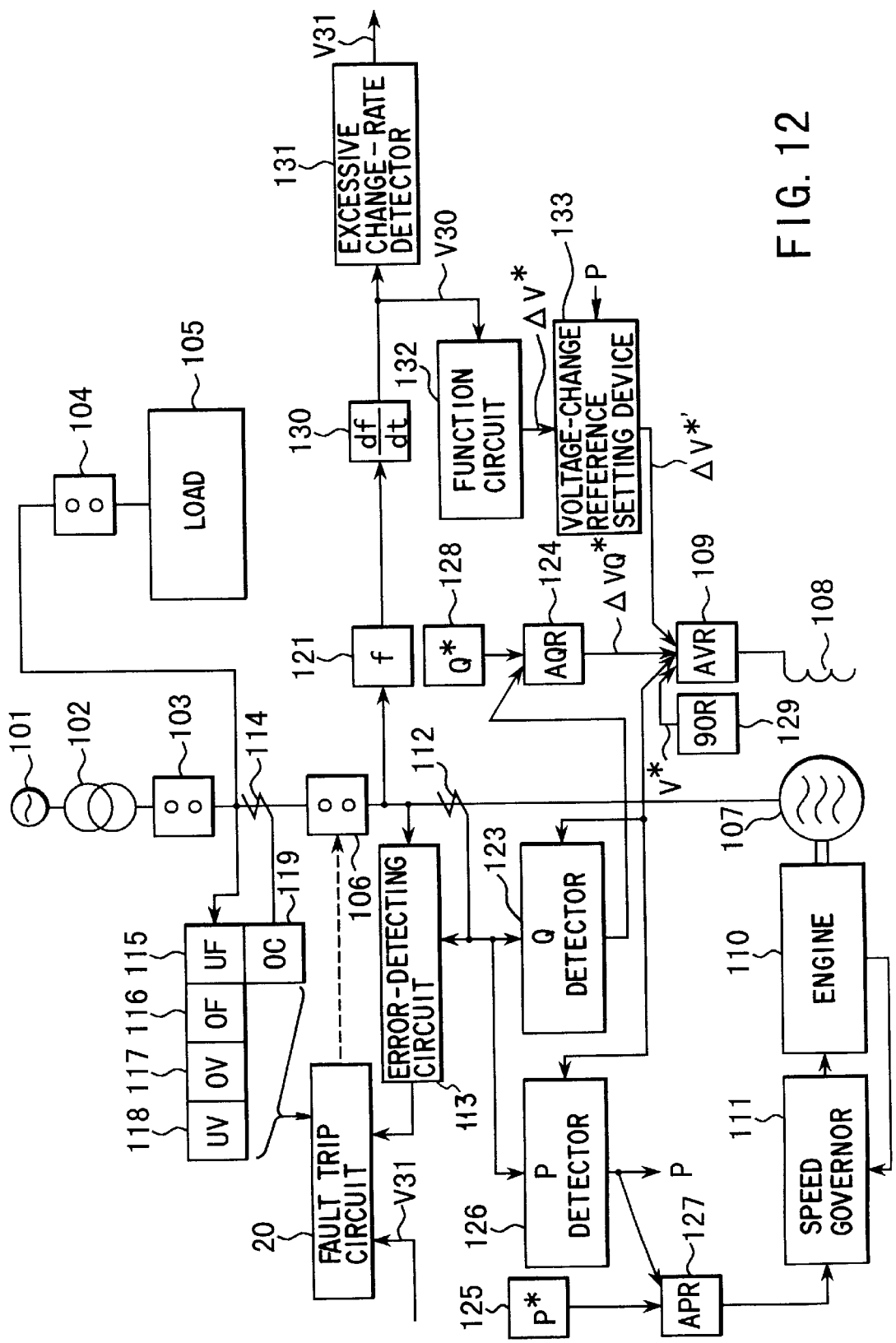
FIG. 12 is a block diagram illustrating an apparatus for protecting a non-utility generation system, which is a twelfth embodiment of the invention.

FIG. 12 is a diagram illustrating the twelfth embodiment of the present invention. This embodiment differs from the conventional (FIG. 1) apparatus for protecting a non-utility generation system in that it has no transfer breaker 38 which is an expensive component and that it is constructed as will be described below.

As shown in FIG. 12, a frequency (f) detector 121 detects the frequency from the output of an AC generator 107. A frequency-change rate (df/dt) detector 130 detects a frequency change rate $V_{30}$.

An excessive frequency-change rate (df/dt) detector 131 detects whether or not the frequency-change rate $V_{30}$ has reached or exceeded a preset value. Upon detecting that the rate $V_{30}$ has reached or exceeded a preset value, the detector 131 outputs an error signal $V_{31}$, which is supplied to a fault trip circuit 120. The fault trip circuit 120 supplies a trip signal to a breaker 106, opening the electric circuit.

A reactive power detector 123 receives the output current of the generator 107, which has been detected by a current transformer 112, and the output voltage of the generator 107, and detects an reactive power therefrom. An active power detector 126 receives the output current of the generator 107, which has been detected by a current transformer 112, and the output voltage of the generator 107, and detects an active power therefrom.

Meanwhile, an active power regulator (APR) 127 compares the active power reference P* set by an active power reference (P*) setting device 125 with the active power P detected by an active power detector 126. The difference between the active power reference and the active power is supplied to a speed governor 111, which controls the of an engine 110.

A function circuit 132 is designed to receive a rate $V_{30}$ of change in the frequency from the frequency-change rate detector 30 and to output a voltage change rate $\Delta V^*$. The voltage change rate $\Delta V^*$ serves to decrease the output voltage of the generator 107, promoting an increase of the frequency, while the frequency change rate remains positive (that is, while the frequency is increasing). The rate $\Delta V^*$ also serves to increase the output voltage of the generator 107, promoting a decrease of the frequency, while the frequency change rate remains negative (that is, while the frequency is decreasing). The voltage change rate $\Delta V^*$ is corrected by a voltage-change reference correcting means 133 on the basis of the active power P detected by the active power detector 126. The means 133 outputs a corrected voltage-change reference $\Delta V^{*'}$.

Figure 13:
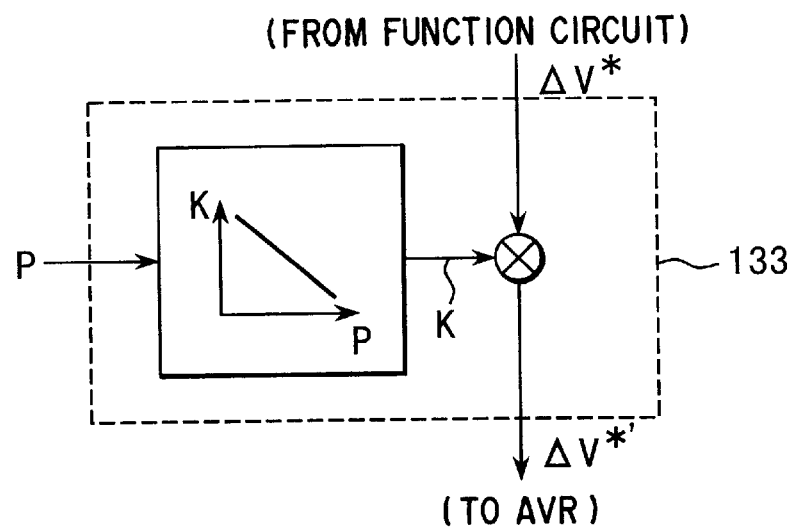
FIG. 13 is a diagram supplemental to the block diagram of the embodiment shown in FIG. 12.

The voltage-change reference correcting means 133 may be designed as shown in FIG. 13. Namely, it may have a gain K which is a function of the active power P detected and may multiply the gain K by the voltage change rate $\Delta V^*$, thereby to obtain a corrected voltage-change reference $\Delta V^{*'}$. The means 133 may of course be of any other structure, so long as it can correct the voltage change rate $\Delta V^*$. For example, it may be designed to act on the function of the function circuit 132, either altering or correcting the function.

A reactive power regulator (AQR) 124 outputs a voltage reference $\Delta VQ^*$ for equalizing the reactive power reference Q* supplied from a reactive power reference setting device 128 and the reactive power detected by the reactive power detector 123.

An automatic voltage regulator (AVR) 109 receives the voltage reference V* from a voltage-reference setting device (90R) 129, the voltage reference $\Delta VQ^*$ from the reactive power regulator 124, and the corrected voltage-change reference $\Delta V^{*'}$ from the voltage-change reference correcting means 133. Using these inputs, the regulator 109 regulates the field magnet of a filed magnet winding 108 in order to control the output voltage of the generator 107.

The active power reference setting device 125, active power regulator 127, speed governor 111 and engine 110 constitute a speed control loop. The reactive power reference setting device 128, reactive power detector 123 and reactive power regulator 124 constitute a reactive power control loop.

The voltage-reference setting device (90R) 129, the voltage reference $\Delta VQ^*$ output from the reactive power regulator 124, the corrected voltage-change reference $\Delta V^{*'}$ supplied from the voltage-change reference correcting means 133, and the automatic voltage regulator (AVR) 9 constitute a voltage control loop.

(Operation)

Figure 14:
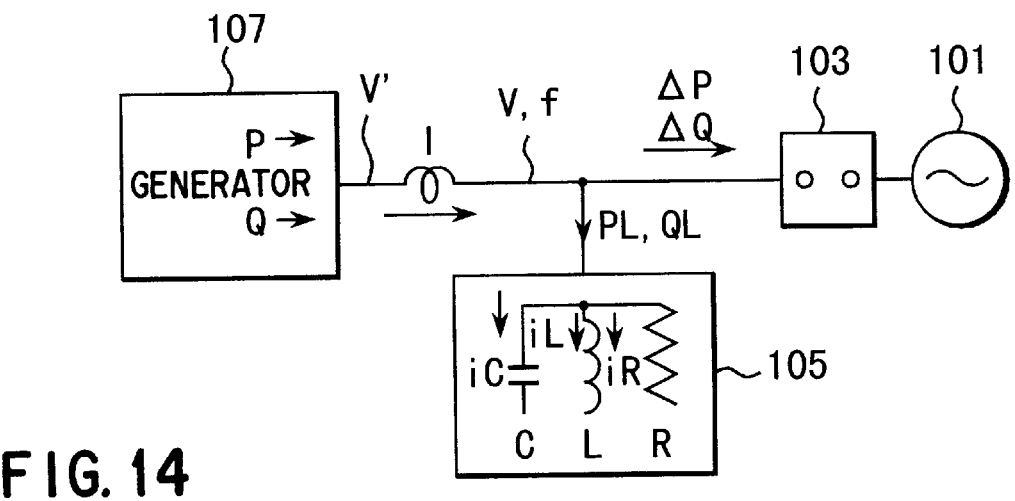
FIG. 14 is a diagram explaining the operation of the embodiment shown in FIG. 12.

The operation of the twelfth embodiment described above will be explained, with reference to FIGS. 14 to 17. The active power $\Delta P$ and reactive power $\Delta Q$, both supplied to a system power supply 1 are given as follows:

$$\Delta P = P - P_L$$

$$\Delta Q = Q - Q_L$$

where P is the active power output by the generator 107, Q is the reactive power output from the generator 107, $P_L$ is the active power a load 105 needs, $Q_L$ is the reactive power the load 105 needs, as is shown in FIG. 14.

Here, I is the inductance I between the generator 107 and the system, V is the voltage applied on the load 105, and f is the frequency.

In most cases, the voltage V on the load 105 and the frequency f scarcely change even if a breaker 103 is opened while $\Delta P$ and $\Delta Q$ are almost zero (0). Thus, relays 115 to 119 are not detected, an isolated operation continues.

However, the phase of a system power supply 101 and the phase of the load 105 gradually deviate from each other. If the breaker 103 is closed again, a great accident may arise. Hence, the breaker 103 cannot be closed again. This will impair the safety operation of the power distribution system.

The voltage during the isolated operation is determined as $P=V^2/R$. On the other hand, the frequency f during the isolated operation is determined by $Q=(V^2\omega C)-(V^2/\omega L)$. The frequency f, in particular, increases when the reactive power the generator 107 supplies advances with respect to the reactive power QL the load 105 needs. In this case, the current $i_C$ in a capacitor C increases and the inductance current $i_L$ decreases, whereby the reactive power changes to become balanced.

When the reactive power Q the generator 107 supplies delays with respect to the reactive power QL the load 105 needs, the frequency f decreases and the inductance current iL increases. The capacitor current iC therefore decreases, and the reactive power becomes balanced.

Figure 15:
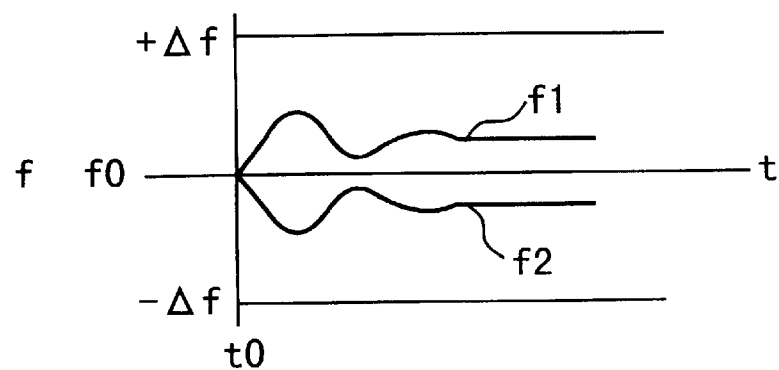
FIG. 15 is a graph explaining the operation of the embodiment shown in FIG. 12.

If $\Delta P=0$ and $\Delta Q \neq 0$, the frequency f approaches either f1 or f2 while changing, as shown in FIG. 15, after the system has been disconnected ($t_0$). In FIG. 15, f1 is the value the frequency f has when $\Delta Q$ is advanced a little, and f2 is the value the frequency f has when $\Delta Q$ is delayed a little. $+\Delta f$ and $-\Delta f$, both shown in FIG. 15, are levels at which the relays 115 to 119 can detect isolated operation.

Figure 16:
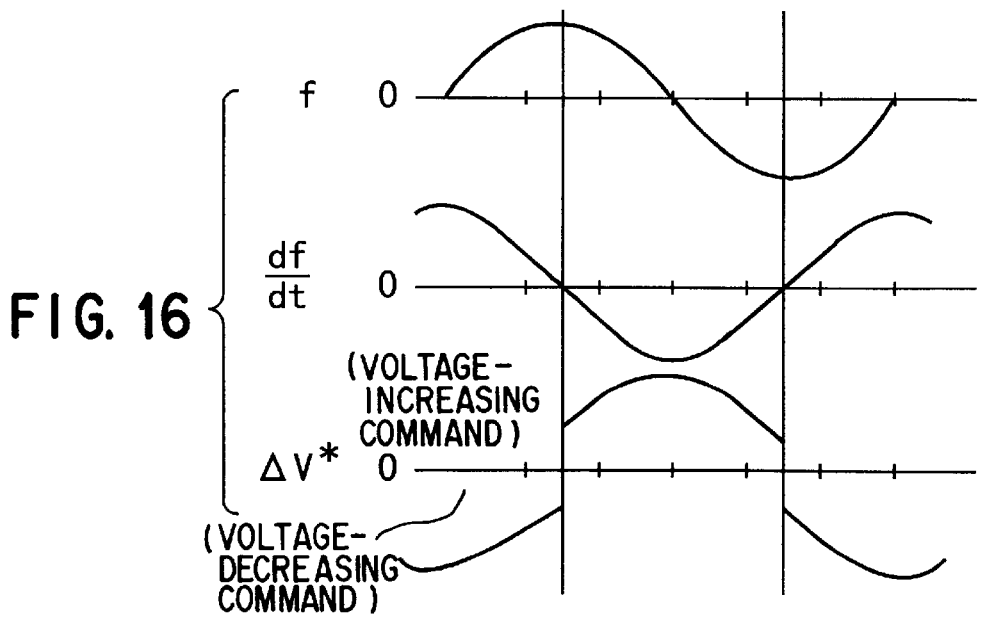
FIG. 16 is a graph explaining the operation of the embodiment shown in FIG. 12.

FIG. 16 is a diagram explaining the operational advantage of the embodiment shown in FIG. 12. In FIG. 16, f is the frequency the frequency detector 121 has detected, df/dt is the frequency change rate the frequency-change rate detector 130 has detected, and the voltage-change reference $\Delta V^*$ is the output the function circuit 32 has generated.

If f changes as shown in FIG. 16, df/dt will have a waveform which advances in phase by 90°.

When df/dt>0, the frequency is increasing. In this case, the function circuit 132 outputs a voltage-decreasing command (an advanced reactive power command), which increases the frequency f further. When df/dt<0, the frequency f is decreasing. In this case, the function circuit 132 outputs a voltage-increasing command (a delayed reactive power command), which decreases the frequency f further. This positive feedback operation increases the rate of frequency change. The excessive frequency-change rate detector 131 detects an anomalous frequency or an excessive rate of frequency change. This makes it possible to detect the isolated operation and protect the system, without using a transfer breaker 138 which is incorporated in the conventional system and which is an expensive device.

This function of increasing the frequency change results from not only the relation between the reactive power and the reactance load, but the change in the active power. Further, the function takes place in the speed control system. The active power change is determined from the relation between the voltage change and the active component of the load. Assuming that the voltage change remains unchanged, the active power is small when the active load component is small, and is large when the active load component is large. When the active power changes, the load torque on the engine 110 changes, too. Hence, the speed changes, which results in a frequency change. The frequency change is small when the active power change is small, and is large when the active power change is large. That is, the frequency change is small when the active load component is small, and is large when the active load component is large, provided that the voltage change remains unchanged. Since protection is performed in accordance with the change in the frequency, it is influenced by the frequency change that is small when the active load component is small. To compensate for this influence, the voltage-change reference correcting means 133 is provided. Even if the active load component is small, the correcting means 133 increases the voltage-change reference, increasing the voltage change. The active power change can therefore be increase. This helps to improve the frequency change.

In the voltage-change reference correcting means 33 having the structure shown in FIG. 13, the influence of the active load component on the frequency change is corrected the gain K on the basis of the active power detected. The means 33 greatly corrects the voltage-change reference ΔV*, generating a corrected voltage-change reference ΔV*'. The voltage-change reference ΔV*', serves to change the voltage so that a sufficient frequency change may be obtained even if the active power is small.

When the active load component is sufficiently large, the frequency change may be excessively large. In this case, the means 133 slightly corrects the voltage-change reference ΔV*, generating a corrected voltage-change reference ΔV*'. This corrected voltage-change reference ΔV*' prevents the voltage change from increasing too much. Hence, the frequency change is prevented from increasing excessively. In the means shown in FIG. 13, the gain K and the active power P have such relation that the gain K is large when the active power P is small, and is small when the active power P is large. Thus, the correction of the voltage-change reference achieves advantages.

Figure 17:
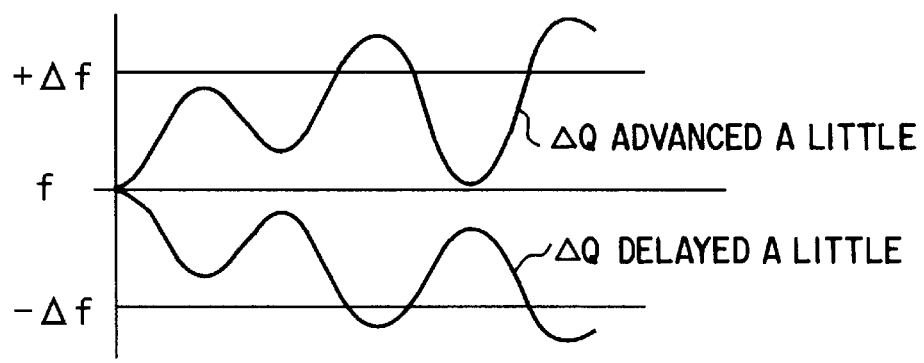
FIG. 17 is a graph explaining the operation of the embodiment shown in FIG. 12.

Such circuits cooperate, increasing the frequency change during the isolated operation as is illustrated in FIGS. 15 to 17. This makes it easy to detect the frequency or an anomalous rate of frequency change, thereby to detect the isolated operation.

(Advantages)

In the twelfth embodiment described above, a voltage-decreasing command is supplied to the automatic voltage regulator 109 when df/dt>0, and a voltage-increasing command is supplied to the automatic voltage regulator 109 when df/dt<0. As a result, the output voltage of the generator 107 is thereby changed, and the frequency change is increased. This makes it easy to detect the isolated operation.

(Thirteenth Embodiment)

(Structure)

Figure 18:
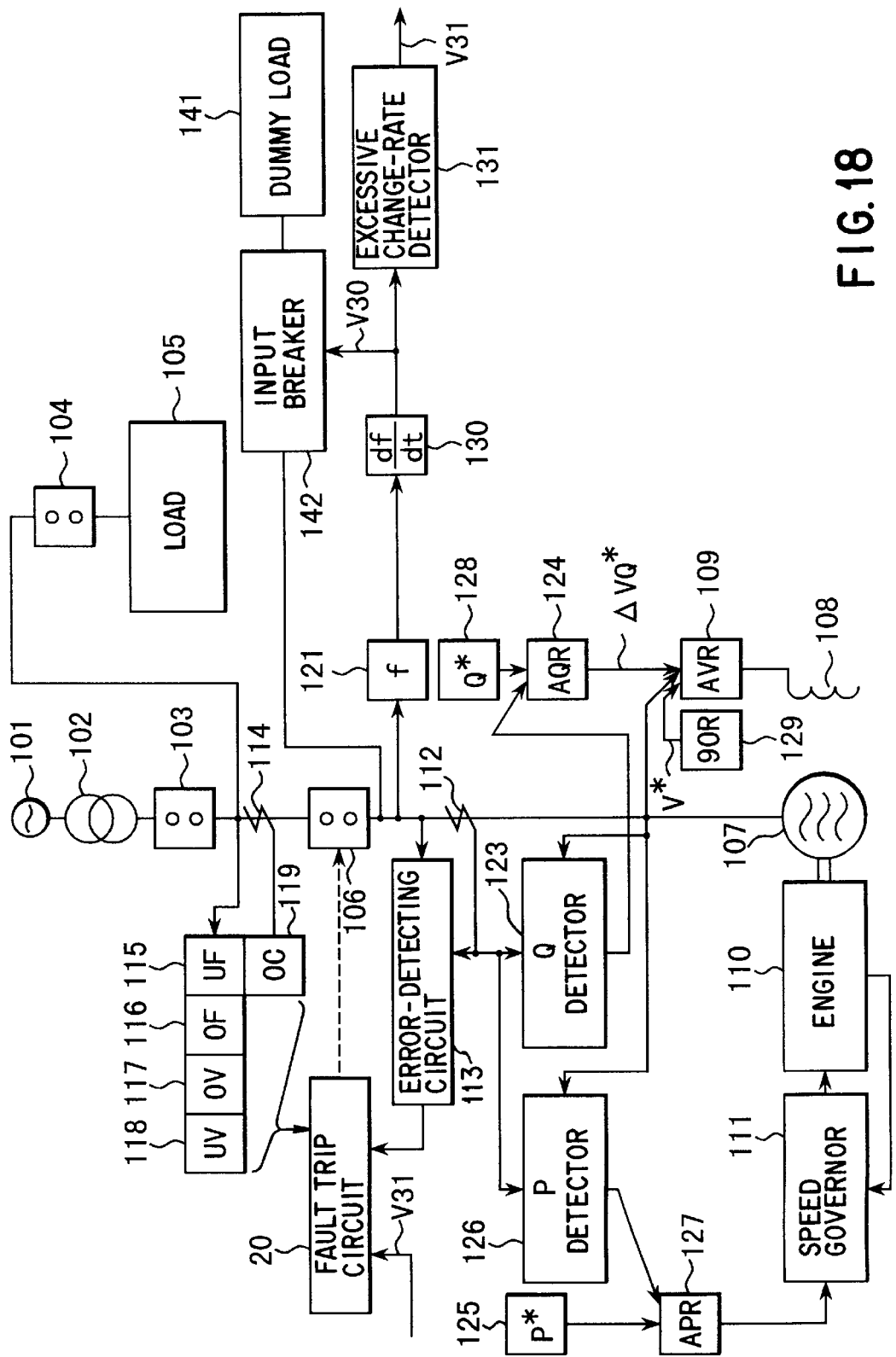
FIG. 18 is a block diagram showing an apparatus for protecting a non-utility generation system, which is a thirteenth embodiment of the invention.

FIG. 18 shows the thirteenth embodiment of the invention. The thirteenth embodiment differs from the embodiment of FIG. 12 in that neither the function circuit 132 for outputting a voltage-change reference nor the voltage-change reference correcting means 133 are provided and that a dummy load 141 and an impedance-inputting breaker 142 are provided. The dummy load 141 is connected to a bus line by the impedance-inputting breaker 142. The dummy load 141 an inductive/capacitive load. It comprises one inductive load and one cacitive load. Alternatively, it comprises a plurality of inductive loads and a plurality of capacitive loads.

Figure 19:
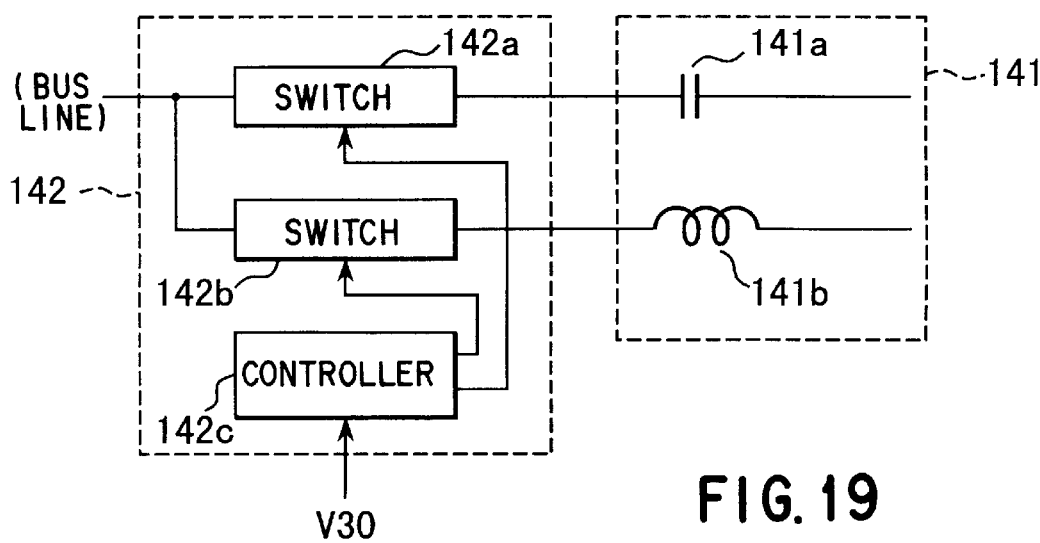
FIG. 19 is a diagram supplemental to the block diagram of the second embodiment of the invention.

The impedance-inputting breaker 142 comprises, for example, switches 142a and 142b and a controller 142c, as shown in FIG. 19. The switch 142a is connected to the capacitive load 141a provided in the dummy load 141. The switch 142b is connected to the inductive load 141b incorporated in the dummy load 141. The controller 142c is provided to open and close the switches 142a and 142b in accordance with a frequency-change rate (df/dt) signal.

(Operation)

As has been explained with reference to FIG. 13 in describing the twelfth embodiment, during the isolated operation the reactive power the generator 107 supplies may advances with respect to the reactive power QL the load 105 needs. In this case, the frequency f increases, increasing the current iC of the capacitor C and decreasing the inductance current iL. The reactive power changes to be balanced. During the isolated operation, the reactive power the generator 107 supplies may delay with respect to the reactive power QL the load 105 needs. If so, the frequency f decreases, decreasing the current iC of the capacitor C and increasing the inductance current iL. The reactive power changes to be balanced.

That is, if the reactive power the generator 107 supplies and the reactive power the load needs greatly differ from each other, the frequency f changes greatly to balance these reactive powers. When the frequency f changes to balance the inactive powers after the start of the isolated operation, it suffices to close or open the dummy load 141 in order to render the reactive powers unbalanced. In the thirteenth embodiment, the dummy load 141 is usually disconnected from the bus line. While df/dt>0 and, hence, the frequency is increasing, only the inductive load is connected to the bus line, thereby further increasing the frequency f. While df/dt<0 and the frequency is decreasing, only the capacitive load is connected to the bus line, thereby further decreasing the frequency f. Thus, the change in the frequency is enhanced. The excessive frequency-change rate detector can therefore detect an anomalous frequency or an excessive rate of frequency change. This makes it possible to detect the isolated operation, without using a transfer breaker 138 which is used in the conventional system and which is an expensive device.

Since the dummy load 141 is usually connected to the bus line, the frequency increases when df/dt>0. When df/dt>0, only the capacitive load is disconnected from the bus line.

When df/dt<0 and the frequency is decreasing, only the inductive load is disconnected from the bus line. However, since the dummy load 141 is always connected, it is necessary to make the reactance of the inductive load and that of the capacitive load substantially equal. The use of such circuits cooperate, increasing the frequency change during the isolated operation as is illustrated in FIGS. 15 to 17. It is therefore easy to detect the frequency or an anomalous rate of frequency change, thereby to detect the isolated operation.

(Advantages)

In the thirteenth embodiment described above, the inductive load or the capacitive load is connected or disconnected in accordance with the polarity of the df/dt detected. The frequency change is thereby increased, making it easy to detect the isolated operation.

(Fourteenth Embodiment)
(Structure)

Figure 20:
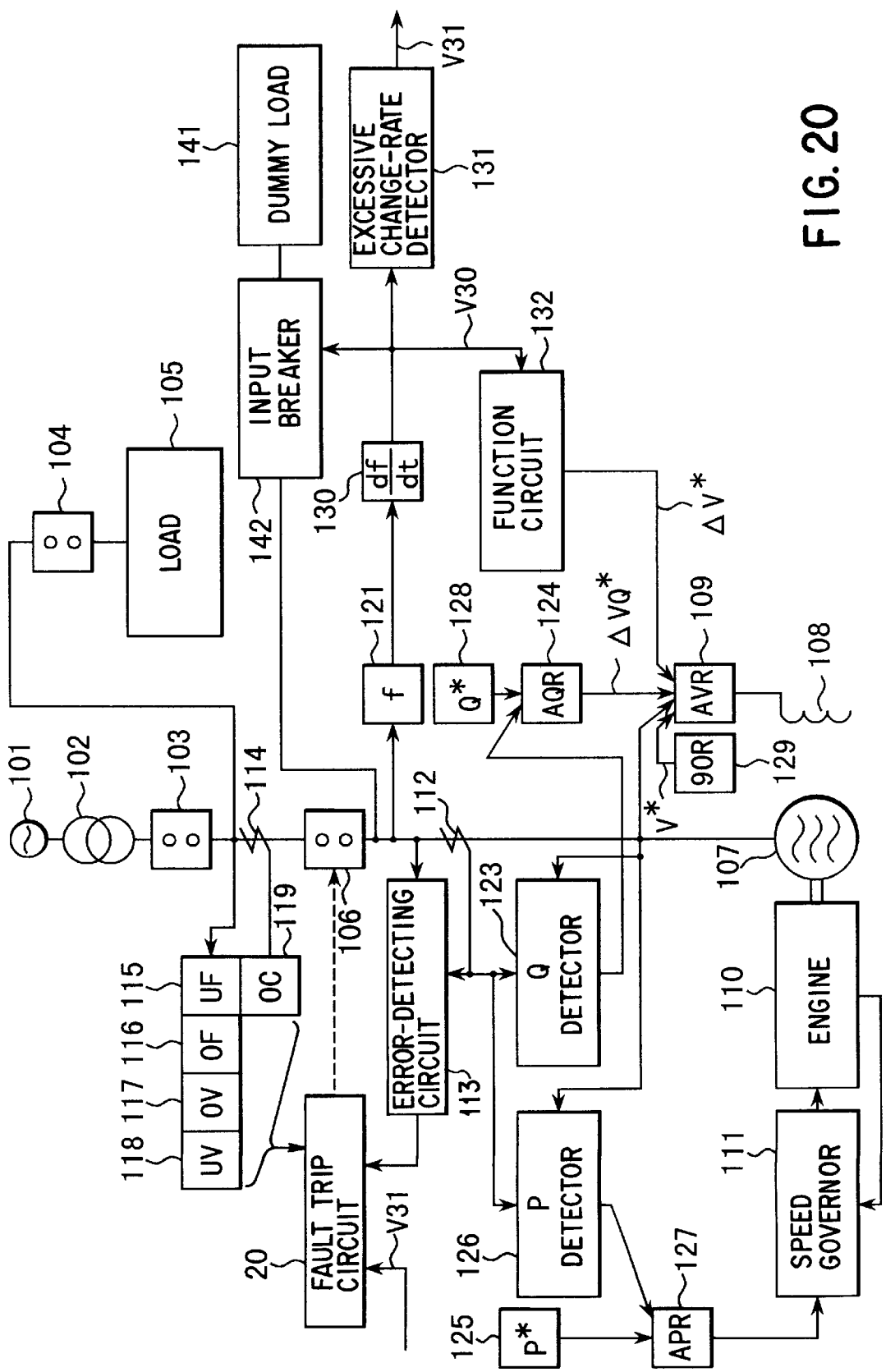
FIG. 20 is a block diagram showing an apparatus for protecting a non-utility generation system, which is a fourteenth embodiment of the invention.

FIG. 20 illustrates the fourteenth embodiment of the present invention. The fourteenth embodiment differs from the thirteenth embodiment of FIG. 18 in that a function circuit 132 is additionally provided. The circuit 132 is designed to output a voltage-change reference $\Delta V^*$.

(Operation and Advantages)

As explained in describing the twelfth and thirteen embodiments, the voltage-change reference $\Delta V^*$ output from the function circuit 132 serves to enhance the change in frequency f. The connection and disconnection of the dummy load 141, controlled by the impedance-inputting breaker 142, also serves to increase the change in frequency f. Needless to say, the voltage-change reference $\Delta V^*$ and the connection and disconnection of the dummy load 141 cooperate, easily increasing the change in frequency f. Hence, the frequency change can be enhanced, even if the voltage-change reference $\Delta V^*$ is increased not so much. The cross current flowing between the generator 107 and the system can be minimized while the generator 107 and the system remain connected.

If the output voltage of the generator 107 rises or falls due to the voltage-change reference $\Delta V^*$, it will influence the change in frequency f with some delay because of the delay in the voltage control loop. On the other hand, the connection or disconnection of the dummy load 141 influences the change in frequency f without delay, because the dummy load 141 is connected or disconnected by the use of the control loop. The connection or disconnection of the dummy load 141 therefore helps to change the output voltage of the generator 107, until the voltage-change reference $\Delta V^*$ starts increasing or decreasing the output voltage of the generator 107.

(Fifteenth Embodiment)
(Structure)

Figure 21:
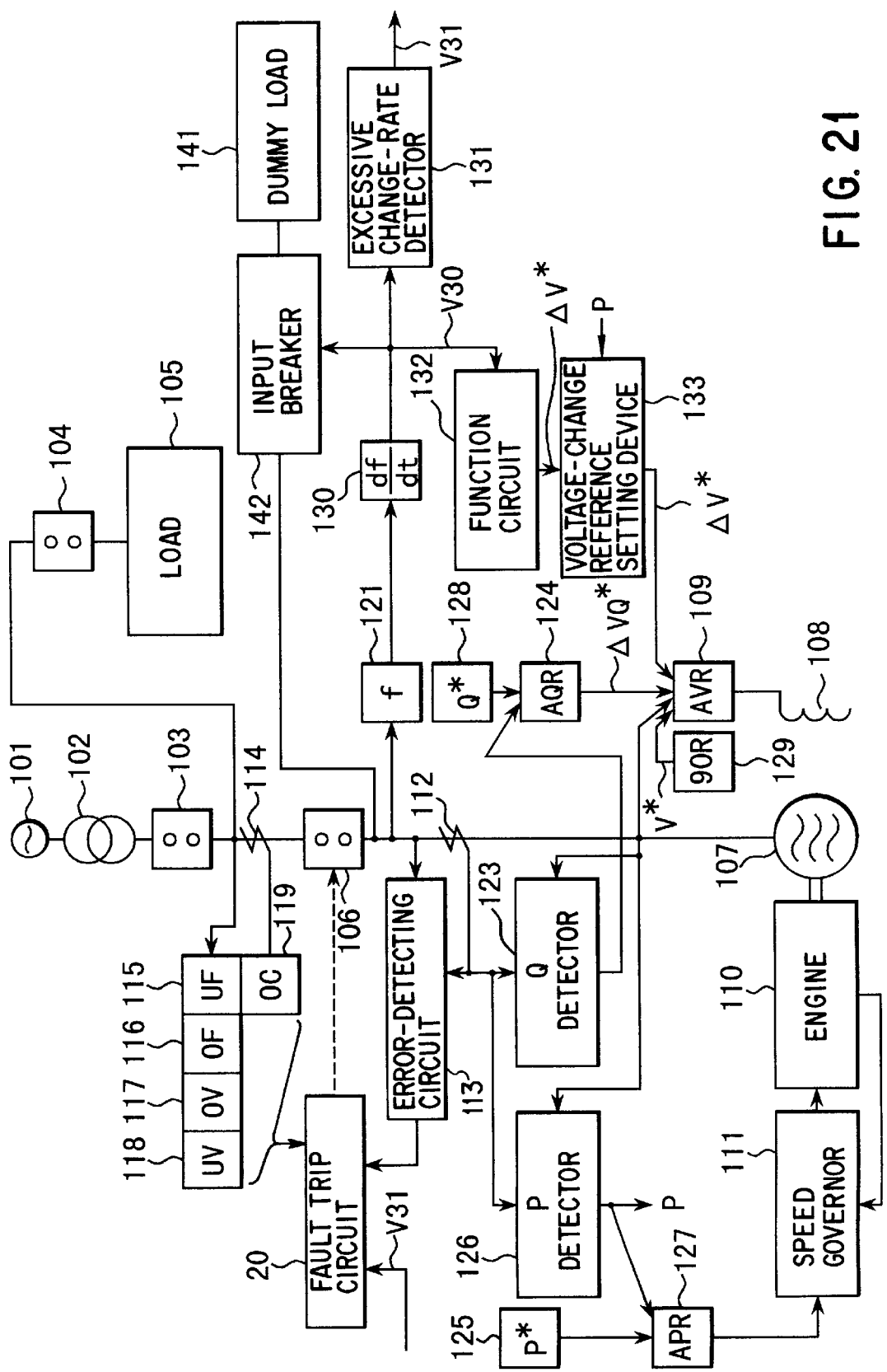
FIG. 21 is a block diagram showing an apparatus for protecting a non-utility generation system, which is a fifteenth embodiment of the invention.

FIG. 21 shows the fifteenth embodiment of the invention. The fifteenth embodiment differs from the twelfth embodiment of FIG. 12 in that a dummy load 141 and an impedance-inputting breaker 142 are additionally provided. Rather, the fifteenth embodiment may be said to differ from the fourteenth embodiment in that a voltage-change reference correcting means 133 is additionally provided.

(Operation and Advantages)

The voltage-change reference $\Delta V^*$ can be increased even if the active power component is small, thereby providing a sufficiently large frequency change, as in the twelfth embodiment. Further, thanks to the voltage-change reference correcting means 133, the voltage-change reference $\Delta V^*$ can be decreased to prevent the frequency change from increasing too much when the active power component is sufficiently large.

(Sixteenth Embodiment)
(Structure)

Figure 22:
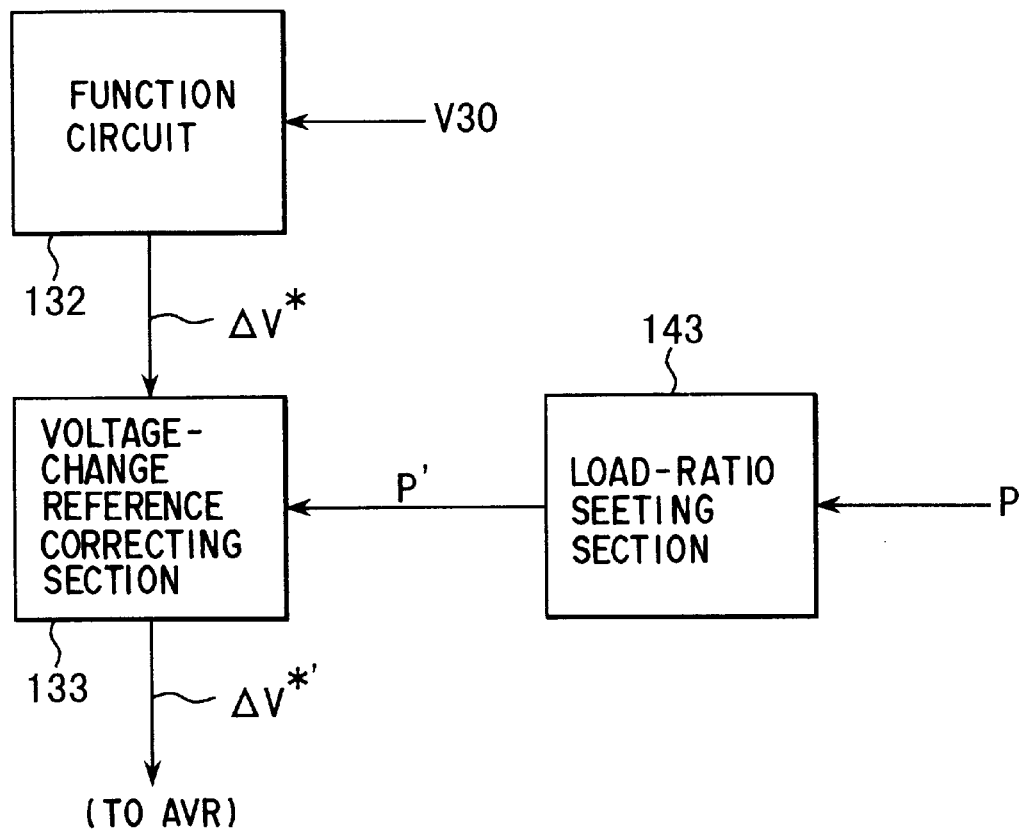
FIG. 22 is a diagram supplemental to the block diagram of a sixteenth embodiment of the invention.
Figure 23:
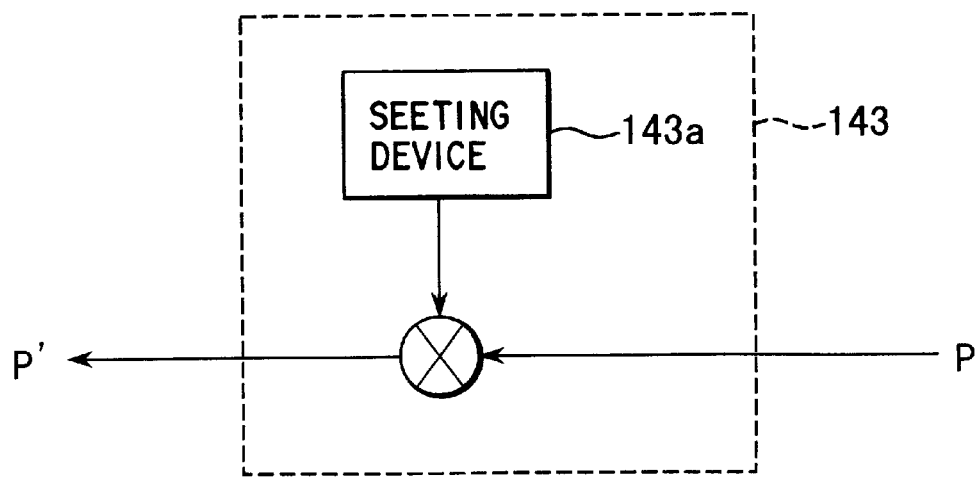
FIG. 23 is a diagram supplemental to the block diagram of a seventeenth embodiment of the invention.

The load 105 may be a constant impedance load or an inductive motor load. In view of this, the sixteenth embodiment differs from the embodiments of FIGS. 12 and 21 in that a signal representing the active power P is not input to the voltage-change reference correcting means 133. Rather, as shown in FIG. 22, the signal is input to a load-ratio setting means 143, the means 143 detects only the active power component P' obtained by the constant impedance load, and a signal representing the active power component P' is input to the voltage-change reference correcting means 133.

The load-ratio setting means 143 has, for example, a setting device 143a. The value preset in the device 143a is multiplied by the signal representing the active power P.

(Operation and Advantages)

In the case of an inductive motor load, the active power does not change so much even if the output voltage of the generator 107 is changed in accordance with the voltage-change reference $\Delta V^*$. Therefore, it cannot be expected as in the twelfth embodiment that the active power changes as the voltage changes or the frequency changes in the speed control system.

Thus, it is detected which part of the active power P detected has resulted from the constant impedance load, and the voltage-change reference $\Delta V^*$ is corrected in accordance with the active power which contributes to the frequency change.

The load-ratio setting means 143 is designed to set the ratio of the constant impedance load. The value the setting device 143a is to set may be determined in the following way.

a) The value is determined on the basis of the ratio of the constant-impedance load and any other load, in consideration of the total load of the house that receives power from the sub-station.

b) The value is determined from the ratio of the constant-impedance load to the any other load, which are always or frequently used in the house that receive power from the sub-station.

c) The value is switched for time zones, because the ratio of the constant-impedance load to the any other load differs from time to time due to the drive pattern of the power plant installed in the house.

To switch the value, a component must be provided to store the data representing the drive pattern.

d) In the case of an inverse tidal current generation, the inverse-current component is not regarded as a constant impedance load, a constant-impedance load is considered to exist in the house only.

Thus, the frequency can be sufficiently changed in consideration of the different degrees in which loads contribute to the frequency change.

(Seventeenth Embodiment)
(Structure)

As shown in FIG. 24, a dummy load 141 is used that comprises a plurality of inductive loads and a plurality of capacitive loads. Active power P or active power P' is used to determine how many or which of these loads should be connected or disconnected. The dummy load 141 is connected or disconnected by an impedance-inputting breaker 142. The impedance-inputting breaker 142 comprises switches 142a to 142f and a controller 142g. The controller 142g receives either the active power P or the active power P' and a rate $V_{30}$ of change in the frequency, and either connects or disconnects the impedance-inputting breaker 142.

(Operation and Advantages)

As described above, the active power supplied to the load is the factor determining the frequency change in the case where the active power is changed due to a voltage change and the frequency is changed by a speed control system. On the other hand, the reactance of the dummy load is the factor determining the frequency change in the case where the frequency is changed as the dummy load is connected or disconnected. The active power may not change greatly as the voltage change and the frequency may not be sufficiently changed by the speed control system, because the active power supplied to the load is not large. In this case, a reactance high enough to change the frequency sufficiently is connected or disconnected.

Assume that the dummy load 141 (i.e., loads 141a, 141b, 141c, 141d, 141e, and 141f) are disconnected from the bus line in FIG. 24. Then, the frequency change can be increased by connecting the inductive loads only, if the frequency change rate $V_{30}$ detected by the detector 130 has a positive value. If the frequency change rate $V_{30}$ has a negative value, the frequency change can be increased by connecting the capacitive loads only. Many dummy loads are connected when the active power P or the active power P' is small. A few dummy load are connected when the active power P or the active power P' is large. Assume that the gain K is equivalent to the number of dummy loads connected. Then, the relation between the active power P or P' and the number of dummy loads to be connected can be regarded as similar to the relation the active power P and the gain K have in the embodiment of FIG. 13.

The dummy loads are connected in specific numbers determined as described above if the loads (141a, 141b, 141c, 141d, 141e and 412f) constituting the dummy load 141 have the same capacitance. The loads may differ in capacitance. In this case, those of the loads which have large capacitance are connected if the active power P or P' is small, and those of the loads which have small capacitance are connected if the active power P or P' is large.

The frequency can thus be changed sufficiently.

(Eighteenth Embodiment)

In the description of the twelfth to seventeenth embodiments, the revolving type generation system comprising the AC generator 107 and engine 110 has been mainly be explained. Instead, either a generation system comprising a DC power supply and an inverter or a reactive power generation system may employed. Either generation system may be controlled to increase the advanced reactive power if the rate of the frequency change has a positive value, and to increase the delayed reactive power if the rate of the frequency change has a negative value. Then, the same advantages can be achieved as in any one of the twelfth to seventeenth embodiments.

(Nineteenth Embodiments)

(Structure)

Figure 25:
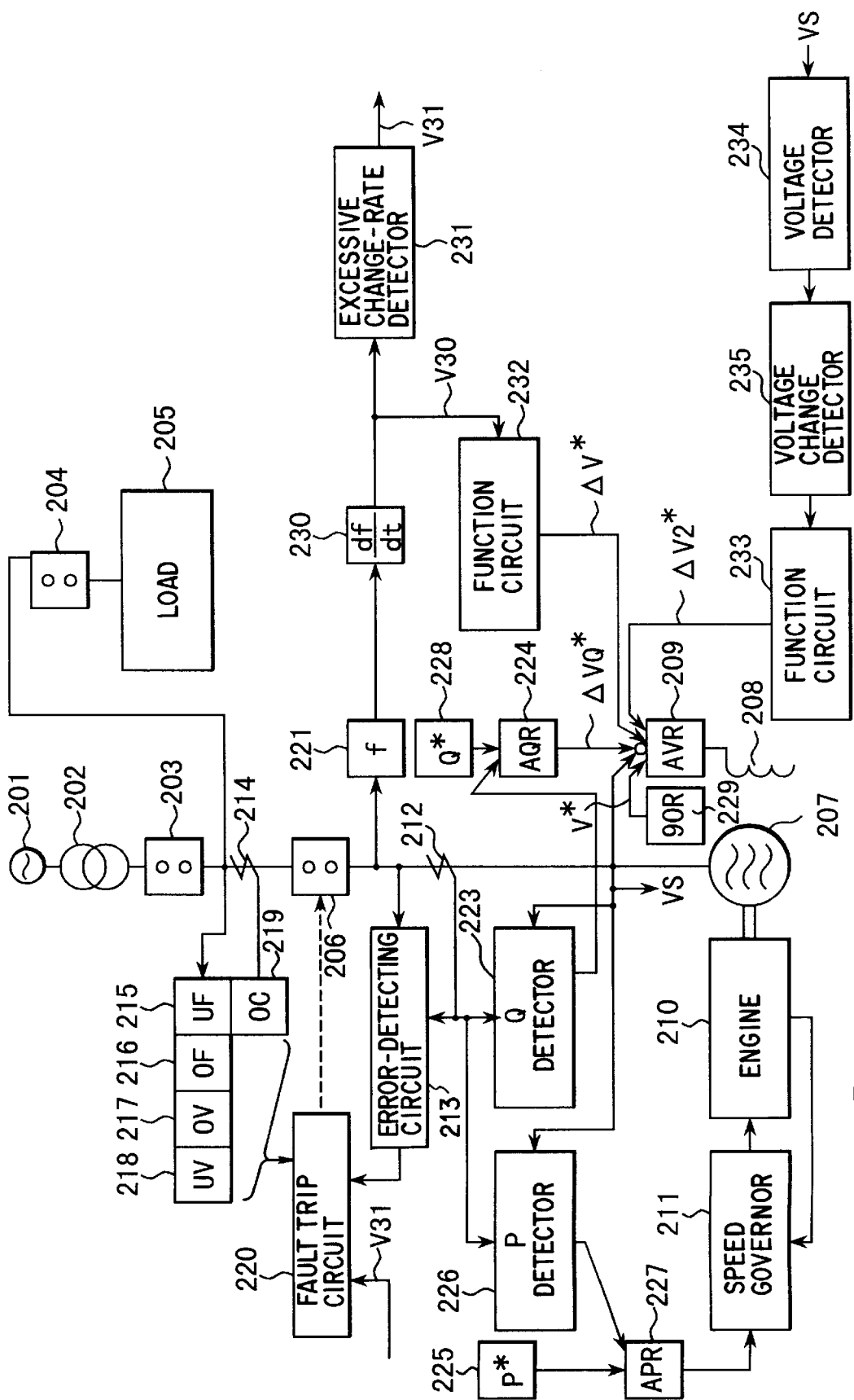
FIG. 25 is a block diagram showing an apparatus for protecting a non-utility generation system, which is a nineteenth embodiment of the invention.

As shown in FIG. 25, a frequency (f) detector 221 detects the frequency from the output voltage of an AC generator 207. A frequency-change rate detector 230 detects a frequency change rate $V_{30}$ from the frequency detected.

An excessive frequency-change rate (df/dt) detector 231 detects whether or not the frequency change rate $V_{30}$ has exceeded a prescribed value. Upon detecting that the rate $V_{30}$ has exceeded the prescribed value, the detector 231 outputs an error signal $V_{31}$, which is supplied to a fault trip circuit 220. The fault trip circuit 220 supplies a trip signal to a breaker 206, opening the electric circuit.

A reactive power detector 223 receives the output current of the generator 207, which has been detected by a current transformer 212, and the output voltage of the generator 207, and detects an reactive power therefrom. An active power detector 226 receives the output current of the generator 107, which has been detected by a current transformer 212, and the output voltage of the generator 207, and detects an active power therefrom.

Meanwhile, an active power regulator (APR) 227 compares the active power reference P* set by an active power reference (P*) setting device 225 with the active power P detected by an active power detector 226. The difference between the active power reference and the active power is supplied to a speed governor 211, which controls the of an engine 210.

A first function circuit 232 receives the frequency change rate $V_{30}$ from the frequency-change rate detector 230 and detects a first voltage-change reference $\Delta V^*$. The voltage-change reference $\Delta V^*$ will decrease the output voltage of the generator 207 to increase the frequency while the frequency change rate has a positive value, or while the frequency is increasing. It will increase the output voltage of the generator 207 to decrease the frequency while the frequency change rate has a negative value, or while the frequency is decreasing. The first voltage-change reference $\Delta V^*$ is supplied to an automatic voltage regulator 209.

A second function circuit 233 calculates a second voltage-change reference $\Delta V2^*$ from the voltage change detected by a voltage change detector 235, on the basis of the output voltage V of the generator 207 that a voltage detector 234 has detected. The second voltage-change reference $\Delta V2^*$ will decrease the output voltage of the generator 207 to increase the frequency while the voltage is decreasing. It will increase the output voltage of the generator 207 to decrease the frequency while the voltage is increasing. The signal which the voltage change detector 235 detects and which is input to the second function circuit may either a voltage change $\Delta V$ or a voltage change rate $dV/dt$.

A reactive power regulator (AQR) 224 outputs a voltage reference $\Delta VQ^*$ for equalizing the reactive power reference $Q^*$ supplied from a reactive power reference setting device 228 and the reactive power detected by the reactive power detector 223.

An automatic voltage regulator (AVR) 209 receives the voltage reference $V^*$ from a voltage-reference setting device (90R) 2029, the voltage reference $\Delta VQ^*$ from the reactive power regulator 224, and the voltage-change reference $\Delta V^*$ from the first function circuit 232, and voltage-change reference $\Delta V2^*$ from the second function circuit 233. Using these inputs, the regulator 209 regulates the field magnet of a filed magnet winding 208 in order to control the output voltage of the generator 207.

The active power reference (P*) setting device 225, active power regulator 227, speed governor 211 and engine 210 constitute a speed control loop. The reactive power reference setting device 228, reactive power detector 223 and reactive power regulator 224 constitute a reactive power control loop. A voltage-reference setting device (90R) 229, the voltage reference $\Delta VQ^*$ output by the reactive power regulator 224, voltage-change reference $\Delta V^*$ supplied from the first function circuit 232, voltage-change reference $\Delta V2^*$ supplied from the second function circuit 233 and automatic voltage regulator 209 constitute a voltage control loop.

(Operation)

Figure 26:
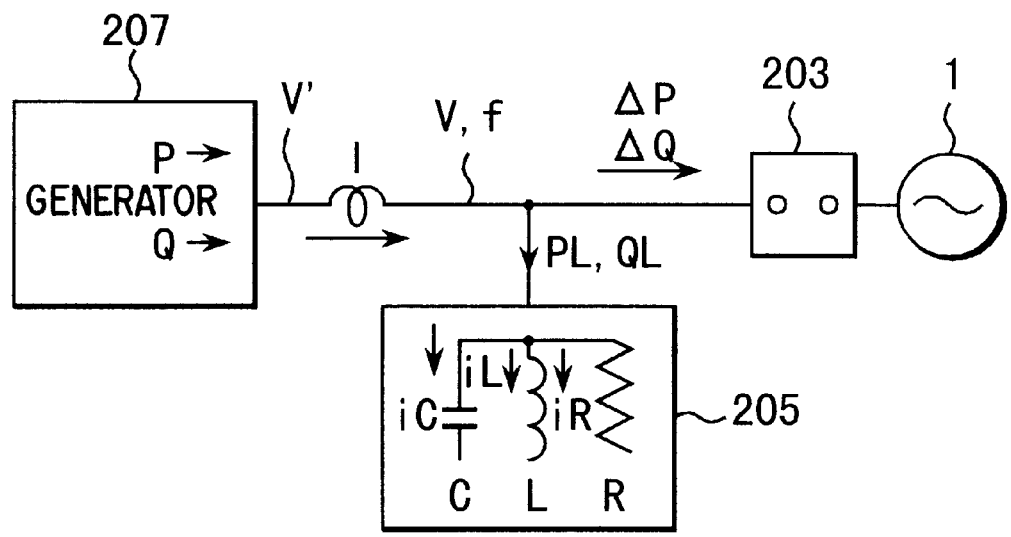
FIG. 26 is a diagram explaining the operation of the embodiment shown in FIG. 25.

The operation of the nineteenth embodiment described above will be explained, with reference to FIGS. 26 to 29. The active power $\Delta P$ and reactive power $\Delta Q$, both supplied to a power system 201 are given as follows:

$$\Delta P = P - P_L$$

$$\Delta Q = Q - Q_L$$

where P is the active power output by the generator 207, Q is the reactive power output from the generator 207, $P_L$ is the active power a load 205 needs, $Q_L$ is the reactive power the load 205 needs, as is shown in FIG. 26.

Here, I is the inductance I between the generator 207 and the system, V is the voltage applied on the load 205, and f is the frequency.

In most cases, the voltage V on the load 205 and the frequency f scarcely change even if a breaker 203 is opened 2 while ΔP and ΔQ are almost zero (0). The change in the frequency cannot be detected, and an isolated operation continues.

However, the phase of a system power supply 201 and the phase of the load 205 gradually deviate from each other. If the breaker 203 is closed again, a great accident may arise. Hence, the breaker 203 cannot be closed again. This will impair the safety operation of the power distribution system.

The voltage during the isolated operation is determined as $P=V^2/R$. On the other hand, the frequency f during the isolated operation is determined by $Q=(V^2\omega C)-(V^2/\omega L)$. The frequency f, in particular, increases when the reactive power the generator 207 supplies advances with respect to the reactive power QL the load 205 needs. In this case, the current $i_C$ in a capacitor C increases and the inductance current $i_L$ decreases, whereby the reactive power changes to become balanced.

When the reactive power the generator 207 supplies is delayed with respect to the reactive power QL the load 205 needs, the frequency f decreases, and the inductance current iL increases. The current $i_C$ in a capacitor C decreases, whereby the reactive power changes to become balanced.

Figure 27:
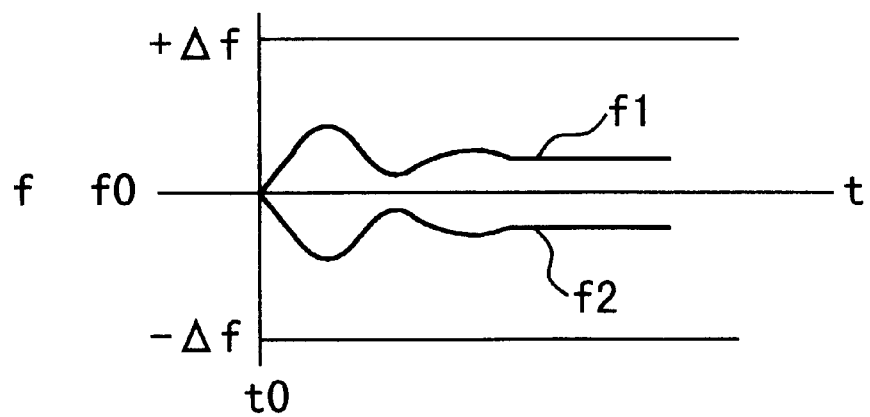
FIG. 27 is a graph explaining the operation of the embodiment shown in FIG. 25.

If ΔP=0 and ΔQ≠0, the frequency f approaches either f1 or f2 while changing, as shown in FIG. 27, after the system has been disconnected ($t_0$). In FIG. 27, f1 is the value the frequency f has when ΔQ is advanced a little, and f2 is the value the frequency f has when ΔQ is delayed a little. +Δf and −Δf, both shown in FIG. 15, are levels at which the relays 215 to 219 can detect isolated operation.

Figure 28:
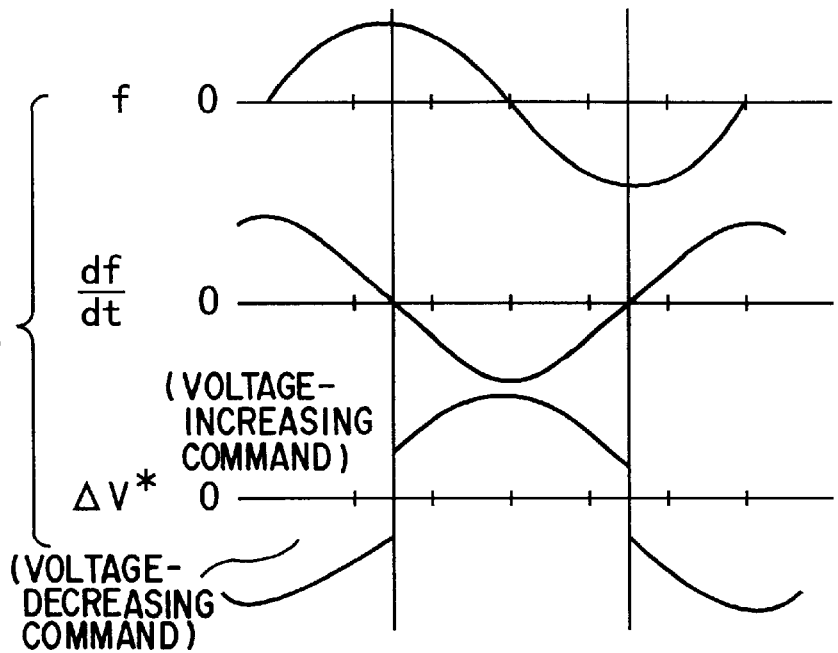
FIG. 28 is a graph explaining the operation of the embodiment shown in FIG. 25.

FIG. 28 is a diagram explaining the operational advantage of the embodiment shown in FIG. 25. In FIG. 28, f is the frequency the frequency detector 221 has detected, df/dt is the frequency change rate the frequency-change rate detector 230 has detected, and the voltage-change reference ΔV* is the output the function circuit 232 has generated.

If f changes as shown in FIG. 28, df/dt will have a waveform which advances in phase by 90°.

When df/dt>0, the frequency is increasing. In this case, the function circuit 232 outputs a voltage-decreasing command (an advanced reactive power command), which increases the frequency f further. When df/dt<0, the frequency f is decreasing. In this case, the function circuit 232 outputs a voltage-increasing command (a delayed reactive power command), which decreases the frequency f further. This positive feedback operation increases the rate of frequency change. The excessive frequency-change rate detector 231 detects an anomalous frequency or an excessive rate of frequency change. This makes it possible to detect the isolated operation and protect the system, without using a transfer breaker 238 which is incorporated in the conventional system and which is an expensive device.

The second function circuit 233 performs positive feedback, further lowering the voltage when the voltage is decreasing, and further raising the voltage when the voltage is increasing. Cooperating with the first function circuit 232, the second function circuit 233 can increase the frequency change.

Figure 29:
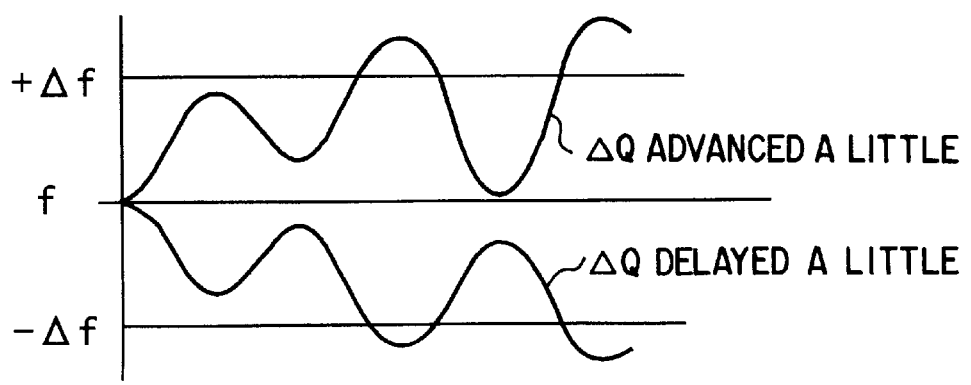
FIG. 29 is a graph explaining the operation of the embodiment shown in FIG. 25.

Thanks to such an additional circuit, the frequency change that occurs during the isolated operation can be increased, from the value shown in FIG. 27 to the value shown in FIG. 29. Hence, an anomalous frequency or an excessive rate of frequency change can be detected to detect the isolated operation easily.

(Advantages)

In the nineteenth embodiment described above, df/dt is detected. A voltage-decreasing command is supplied to the automatic voltage regulator 209 when df/dt>0, and a voltage-increasing command is supplied to the regulator 209 when df/dt<0. Moreover, a voltage command for amplifying the voltage change is supplied to the voltage regulator 209. The output voltage of the generator 207 is thereby changed, thus increasing the frequency change. This makes it easy to detect the isolated operation.

(Twentieth Embodiment) (Corresponding to claim 2)
(Structure)

Figure 30:
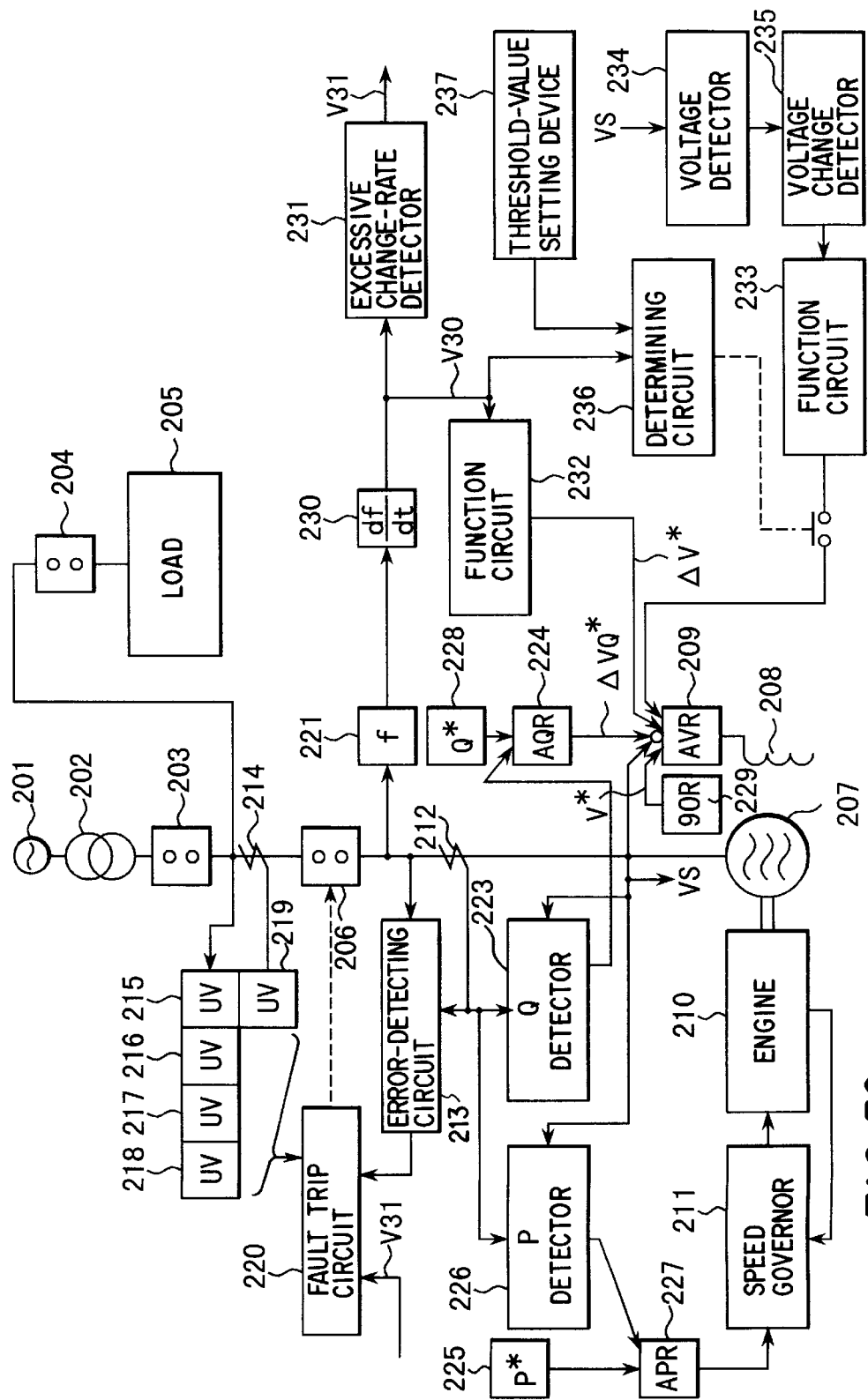
FIG. 30 is a block diagram showing an apparatus for protecting a non-utility generation system, which is a twentieth embodiment of the invention.

FIG. 30 shows the twentieth embodiment of the invention. The twentieth embodiment differs from the nineteenth embodiment of FIG. 25 in that a determining circuit 236 and a threshold-value setting device 237 are additionally provided. The device 237 has set a threshold value for the frequency change rate. The circuit 236 determines whether or not the output of the second function circuit 233 should be input to the automatic voltage regulator 209, in accordance with the threshold value set by the threshold-value setting device 237.

The threshold-value setting device 237 sets both a threshold value for the positive frequency change rate, i.e., the rate at which the frequency increases, and a threshold value for the negative frequency change rate, i.e., the rate at which the frequency decreases.

(Operation)

This embodiment is based on the nineteenth embodiment. It is identical to the nineteenth embodiment in that a voltage change is induced to increase the frequency change. Even if the system operates well and remains connected, the second function circuit 233 may output a voltage-change reference ΔV2* from the voltage change in the system, in order to amplify the voltage change. If this happens, the reactive power will unnecessarily change between the generation system and the power system. Therefore, only the first function circuit 232 is first operated, thus changing the frequency. If the frequency change rate exceeds a specific value, the system is considered to have been disconnected from the power system and the second function circuit 233 is then operated.

The voltage-change reference is therefore be prevented from unnecessarily increasing while the system remains connected. An excessive change in reactive power is thereby prevented, and the frequency change during the isolated operation is increased, from the value shown in FIG. 27 to the value shown in FIG. 29. Thus, an anomalous frequency or an excessive rate of frequency change is detected to detect the isolated operation easily.

(Advantages)

In the twentieth embodiment described above, df/dt is detected. A voltage-decreasing command is supplied to the automatic voltage regulator 209 when df/dt>0, and a voltage-increasing command is supplied to the regulator 209 when df/dt<0. Moreover, a voltage command for amplifying the voltage change is supplied to the voltage regulator 209. The output voltage of the generator 207 is thereby changed, thus increasing the frequency change. This makes it easy to detect the isolated operation.

(Twenty-First Embodiment)
(Structure)

Figure 31:
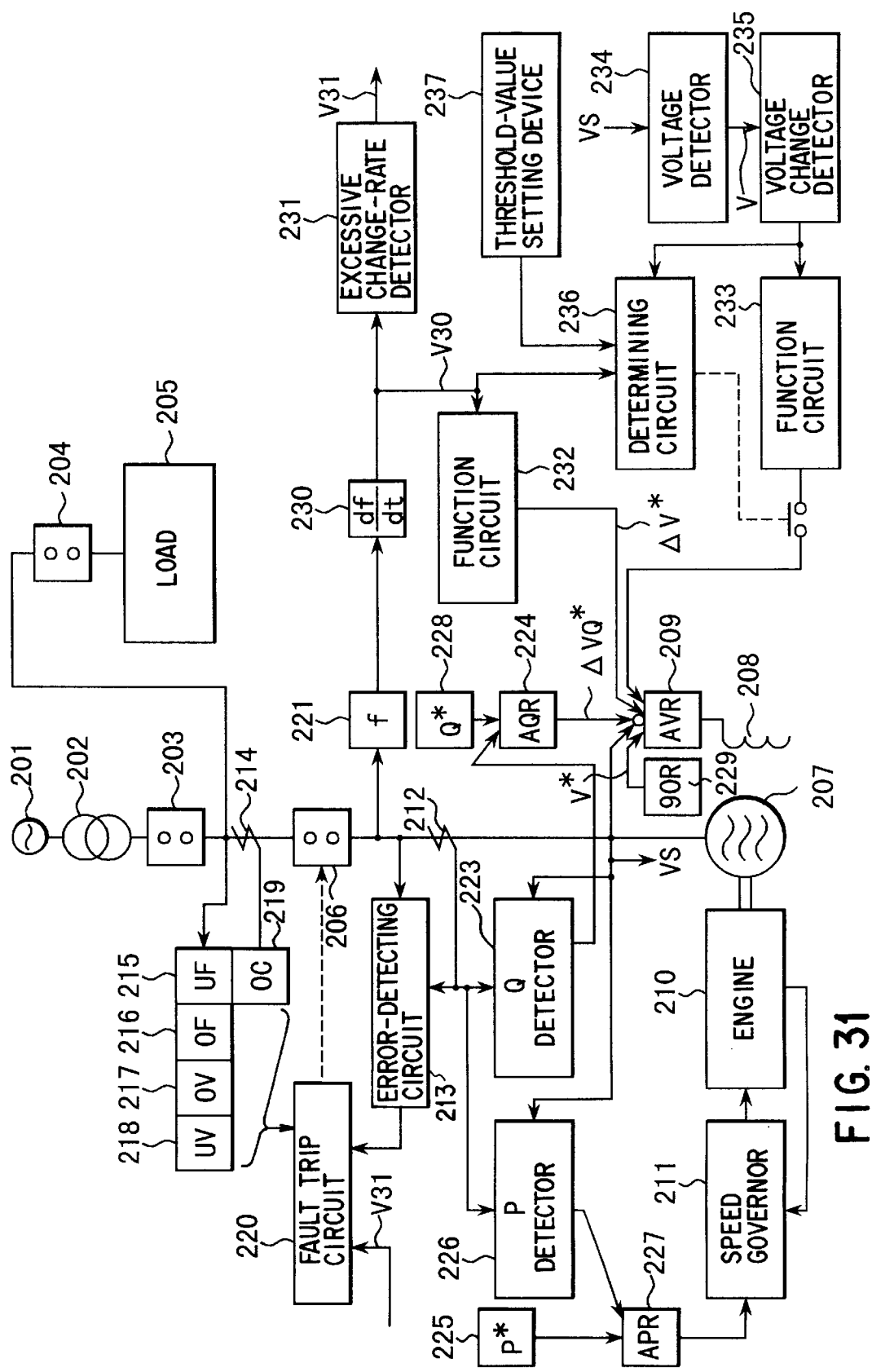
FIG. 31 is a block diagram showing an apparatus for protecting a non-utility generation system, which is a twenty-first embodiment of the invention.

FIG. 31 shows the twenty-first embodiment of the invention. The twenty-first embodiment differs from the twentieth embodiment of FIG. 30 in a respect. The circuit 236 determines whether the output of the second function circuit 233 should be input to the automatic voltage regulator 209, not only by comparing the frequency change rate with the threshold value supplied from the threshold-value setting device 237, but also by using the direction of frequency change and the direction of voltage change, which are respectively represented by the frequency change rate and the output signal of the voltage change detector 235.

(Operation)

The present embodiment is based on the nineteenth embodiment. It is identical to the nineteenth embodiment in that a voltage change is induced to increase the frequency change.

In the twentieth embodiment described above, only the first function circuit 232 is usually operated and both the first function circuit 232 and the second function circuit 233 are operated after the frequency change rate exceeds the threshold value.

A voltage change is induced in the first function circuit 232 which usually operates, thereby increasing the frequency change. After the system has been disconnected from the power system, the frequency increases as the voltage lowers, or the frequency decreases as the voltage rises. Hence, if the frequency changes as the voltage changes in this manner and if the frequency change rate exceeds the threshold value, the system is considered to have been disconnected from the power system. In this case, the second function circuit 233 is operated. This prevents the voltage-change reference from unnecessarily increasing while the system remains connected. As a result, an excessive change in reactive power is prevented, and the frequency change during the isolated operation is increased, from the value shown in FIG. 27 to the value shown in FIG. 29. Thus, an anomalous frequency or an excessive rate of frequency change is detected to detect the isolated operation easily.

(Advantages)

In the twenty-first embodiment described above, df/dt is detected. A voltage-decreasing command is supplied to the automatic voltage regulator 209 when df/dt>0, and a voltage-increasing command is supplied to the regulator 209 when df/dt<0. Further, a voltage command for amplifying the voltage change is supplied to the voltage regulator 209. The output voltage of the generator 207 is thereby changed, thus increasing the frequency change. This makes it easy to detect the isolated operation.

(Twenty-Second Embodiment)
(Structure)

Figure 32:
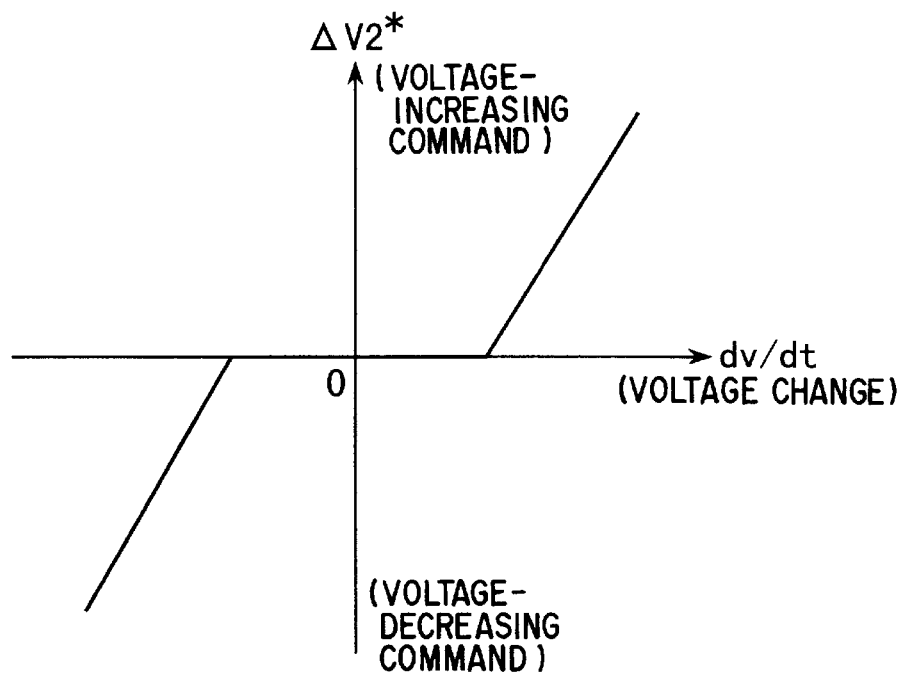
FIG. 32 is a diagram supplemental to the block diagram of a twenty-second embodiment of the invention.

In the nineteenth embodiment, the second function circuit 233 calculates a second voltage-change reference $\Delta V2^*$ from the voltage change detected by the voltage change detector 235, on the basis of the output voltage V of the generator 207 that a voltage detector 234 has detected. In the twenty-second embodiment, the function set in the second function circuit 233 has a dead zone. In the dead zone of the function, the voltage change dv/dt is not detected while remaining within a specific range, as is illustrated in FIG. 32.

(Operation)

While the system remains connected, the system voltage dominates the voltage that is detected as the output voltage of the generator 207. In other words, the voltage detected as the output voltage of the generator 207 changes when the system voltage changes. Even while the system is operating well, the voltage keeps changing due to the fluctuation of load occurring in the same distribution system, the switching of taps performed in the substation, or the like. This means that the second voltage-change reference $\Delta V2^*$ is usually output on the basis of the voltage change. The reactive power unnecessarily change between the generation system and the power system. To avoid this unnecessary change in reactive power, the second function circuit 233 is designed not to detect the voltage change as long as the voltage change remains in a specific range. Thus, the second function circuit 233 prevents changes of the reactive power while the voltage change remains in that specific range. Once the isolated operation starts, the first function circuit 232 starts operating. When the voltage changes sufficiently, the second function circuit 233 starts operating. The frequency change during the isolated operation is increased, from the value shown in FIG. 27 to the value shown in FIG. 29. Thus, an anomalous frequency or an excessive rate of frequency change is detected to detect the isolated operation easily.

(Advantages)

In the twenty-second embodiment described above, df/dt is detected. A voltage-decreasing command is supplied to the automatic voltage regulator 209 when df/dt>0, and a voltage-increasing command is supplied to the regulator 209 when df/dt<0. Further, a voltage command for amplifying the voltage change is supplied to the voltage regulator 209. The output voltage of the generator 207 is thereby changed, thus increasing the frequency change. This makes it easy to detect the isolated operation.

(Twenty-Third Embodiment)
(Structure)

Figure 33:
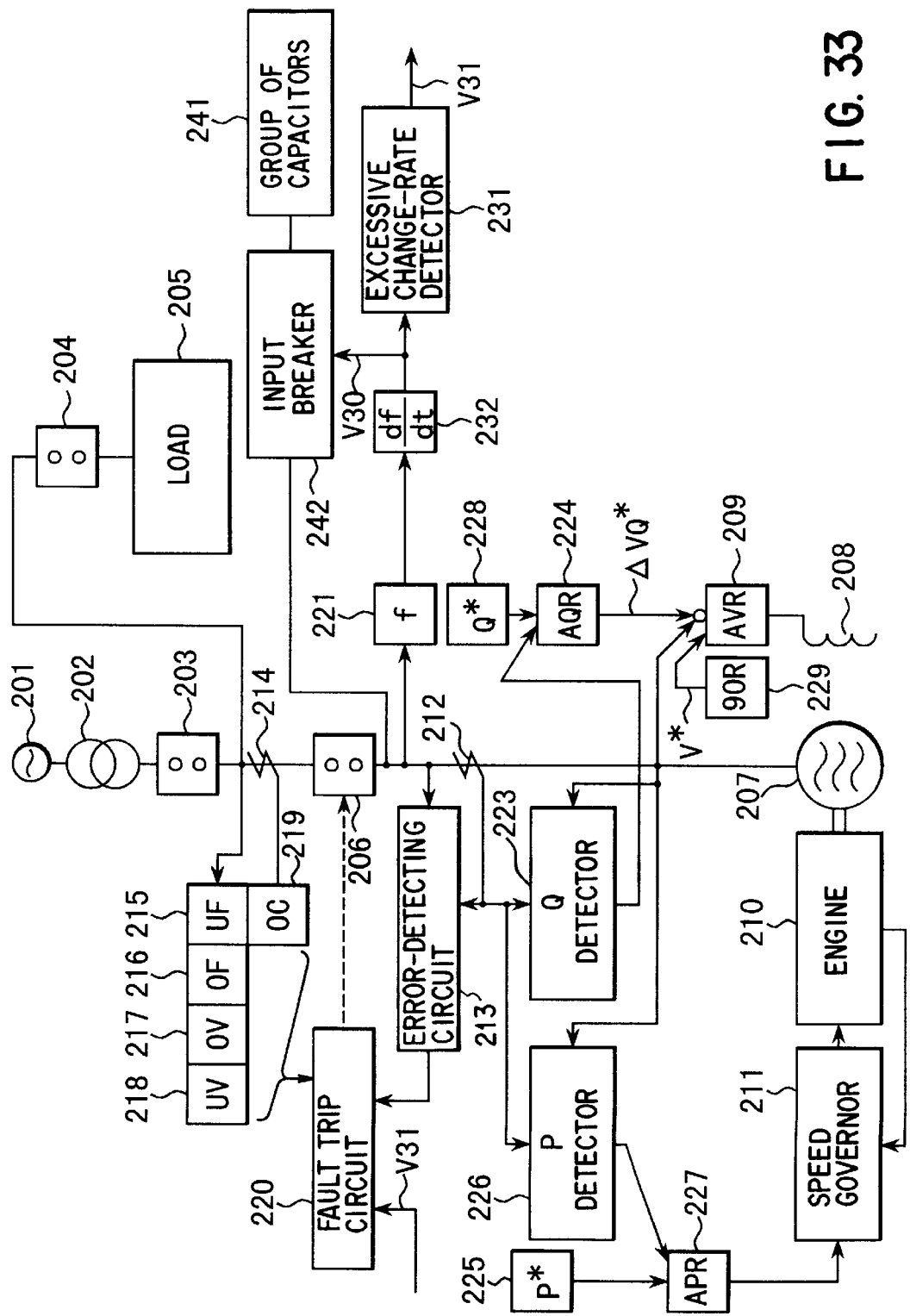
FIG. 33 is a block diagram showing an apparatus for protecting a non-utility generation system, which is a twenty-third embodiment of the invention.

FIG. 33 shows the twenty-third embodiment of the present invention. The twenty-first embodiment differs from the nineteenth embodiment of FIG. 19 in that no components equivalent to the function circuits 232 and 233 for outputting voltage-change references and the voltage change detector 235. It also differs in that a group 241 of capacitors and an input breaker 242 are additionally provided.

Figure 34:
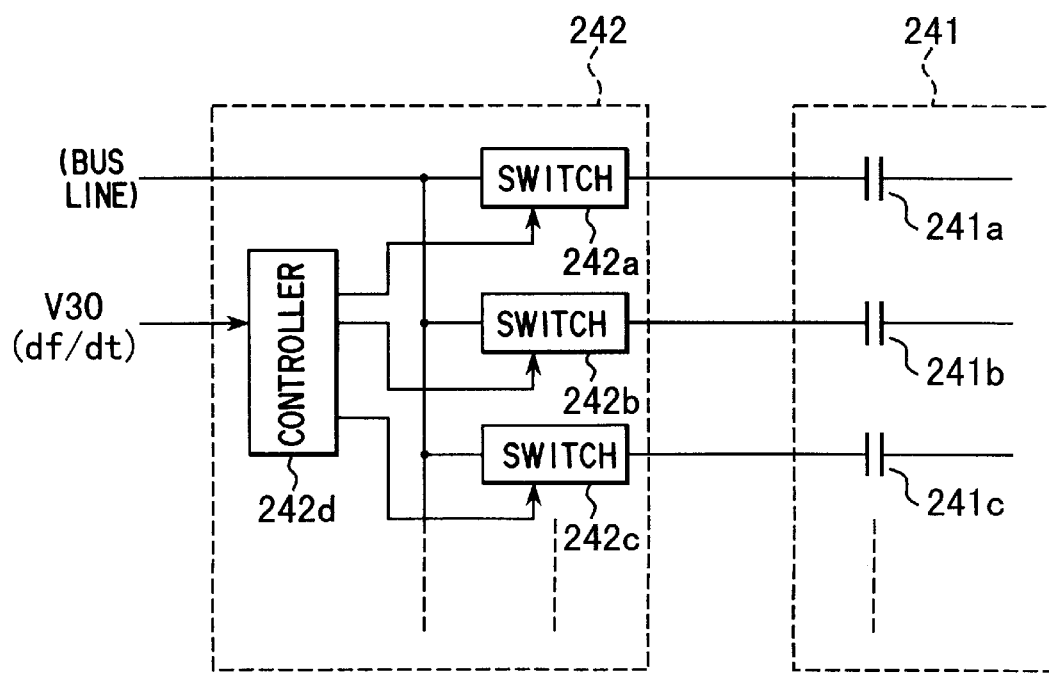
FIG. 34 is a diagram supplemental to the block diagram of a twenty-fourth embodiment of the invention.

As shown in FIG. 34, the group 241 consists of power capacitors 242a, 241b, 241c . . . The capacitors are connected to a bus line by the input breaker 242. The input breaker 242 comprises switches 242a, 242b, 242c, . . . , and a controller 242d. The controller 142d either connects or disconnects the input breaker 142 in accordance with a signal representing a frequency change rate (df/dt).

(Operation)

As has been explained with reference to FIG. 26, in describing the nineteenth embodiment, during the isolated operation the reactive power the generator 207 supplies may advances with respect to the reactive power QL the load 205 needs. In this case, the frequency f increases, increasing the current iC of the capacitor C and decreasing the inductance current iL. The reactive power changes to be balanced. During the isolated operation, the reactive power the generator 107 supplies may delay with respect to the reactive power QL the load 205 needs. If so, the frequency f decreases, decreasing the current iC of the capacitor C and increasing the inductance current iL. The reactive power changes to be balanced.

That is, if the reactive power the generator 207 supplies and the reactive power the load needs greatly differ from each other, the frequency f changes greatly to balance these reactive powers. When the frequency f changes to balance the inactive powers after the start of the isolated operation, it suffices to close or open the capacitors (241a, 241b, . . . ) in order to render the reactive powers unbalanced.

The group 241 of capacitors may be regarded as a power-factor improving capacitor provided to the power-factor of the load. Assume that some of the capacitors of the group 241 have been connected to the bus line in order to cancel out the capacitive reactance of the load. While df/dt>0, that is, while the frequency is increasing, the frequency f will further increase if the capacitors are disconnected from the bus line. While df/dt<0, that is, the frequency is decreasing, the frequency f will further decrease if the capacitors are connected to the bus line. Thus, the change in the frequency is enhanced. The excessive frequency-change rate detector 231 can therefore detect an anomalous frequency or an excessive rate of frequency change. This makes it possible to detect the isolated operation, without using a transfer breaker which is used in the conventional system and which is an expensive device.

Thanks to such an additional circuit, the frequency change that occurs during the isolated operation can be increased, from the value shown in FIG. 27 to the value shown in FIG. 29. Hence, an anomalous frequency or an excessive rate of frequency change can be detected to detect the isolated operation easily.

(Advantages)

In the twenty-third embodiment described above, df/dt is detected. The power capacitors are connected or disconnected in accordance with the polarity of the df/dt detected. The frequency change is thereby increased, making it easy to detect the isolated operation.

(Twenty-Fourth Embodiment)

(Structure)

Figure 35:
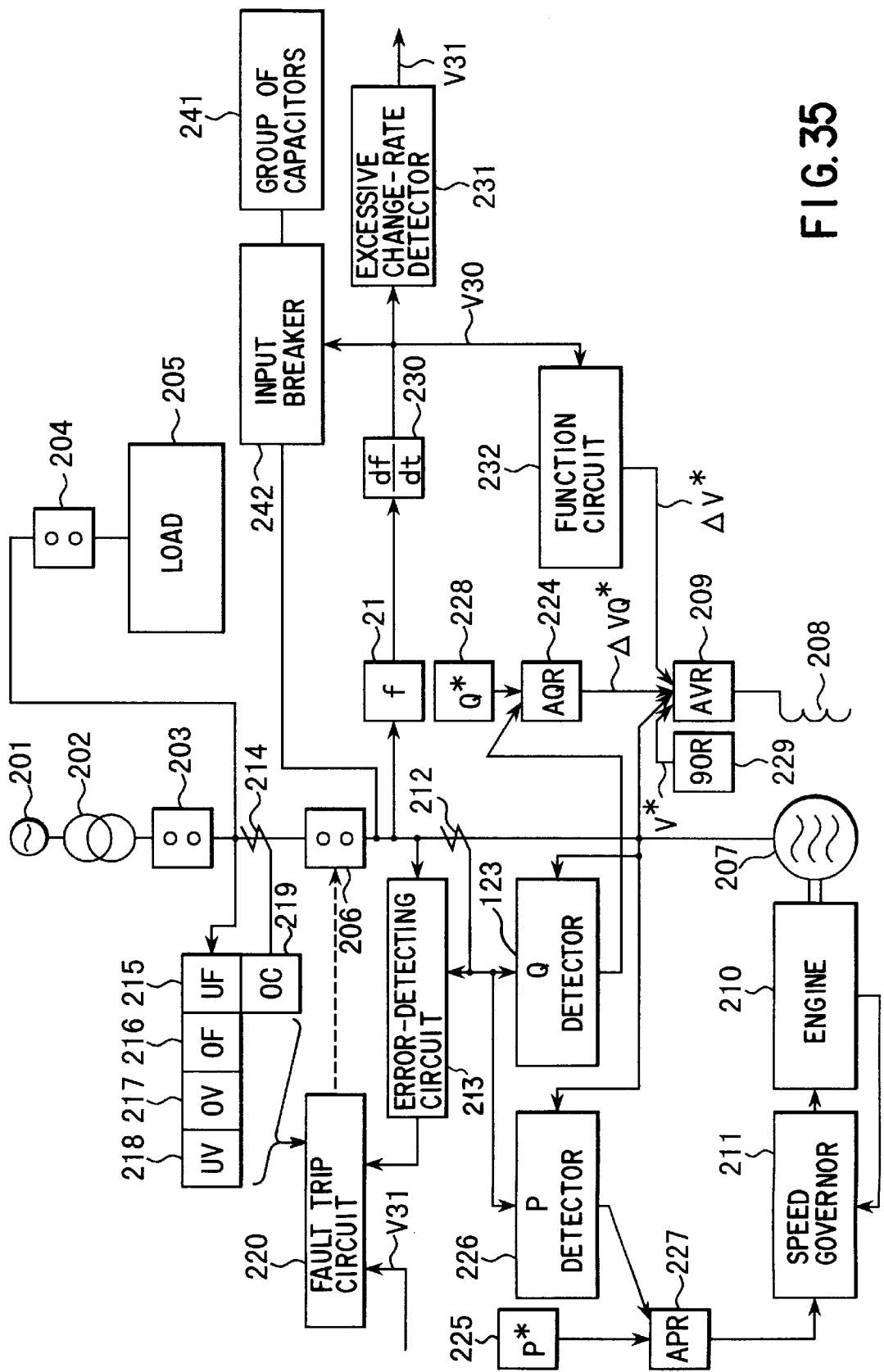
FIG. 35 is a block diagram depicting an apparatus for protecting a non-utility generation system, which is a twenty-sixth embodiment of the invention.
Figure 36:
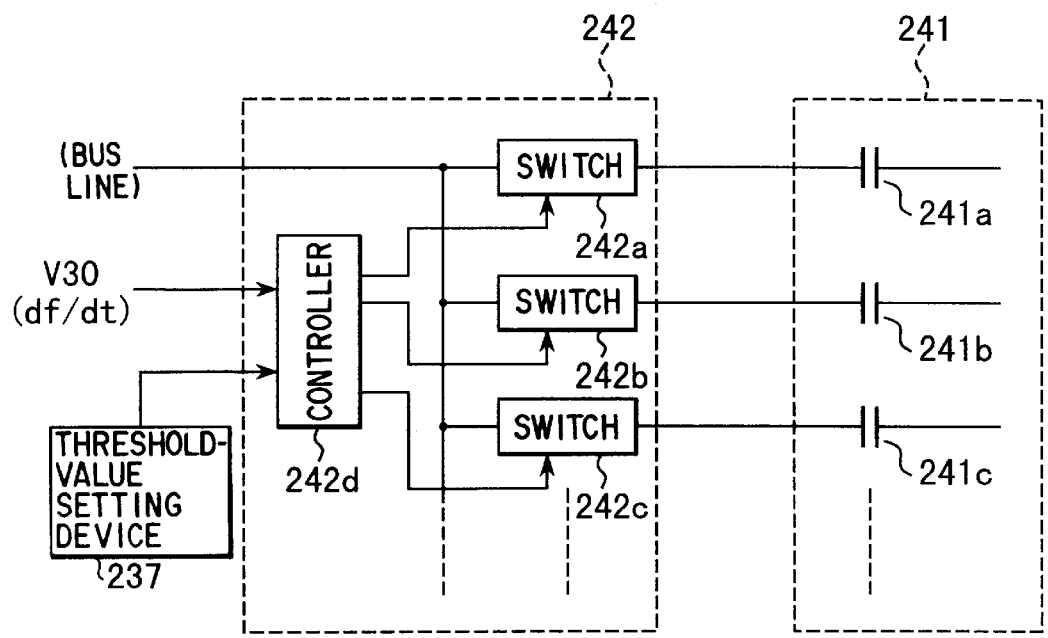
FIG. 36 is a block diagram showing an apparatus for protecting a non-utility generation system, which is a twenty-seventh embodiment of the invention.

FIG. 35 shows the twenty-fourth embodiment of the invention. The twenty-fourth embodiment differs from the nineteenth embodiment of FIG. 19 in that no components equivalent to the second function circuit 233, voltage detector 234 and voltage change detector 235. It also differs in that a group 241 of capacitors and an input breaker 242 are additionally provided. The group 41 of capacitors and the input breaker 242 are identical in structure to those shown in FIG. 34, respectively.

(Operation and Advantages)

As has been described in explaining the nineteenth and twenty-third embodiments, the voltage-change reference ΔV* output from the function circuit 232 has the function of increasing the frequency change further. The frequency change is also increased by disconnecting the group 241 of capacitors.

Thanks to the reference ΔV* and the disconnection of the group 241, the frequency change that occurs during the isolated operation can be increased, from the value shown in FIG. 27 to the value shown in FIG. 29. An anomalous frequency or an excessive rate of frequency change can thereby be detected to detect the isolated operation easily.

(Twenty-Fifth Embodiment)

(Structure)

The twenty-fifth embodiment differs from the sixth embodiment shown in FIGS. 34 and 35 in that a threshold-value setting device 237 is additional provided. The device 237 is designed to input a signal to the controller 2422d incorporated in the input breaker 242a. The signal represents a threshold value for the frequency change rate.

The threshold-value setting device 237 sets both a threshold value for the positive frequency change rate, i.e., the rate at which the frequency increases, and a threshold value for the negative frequency change rate, i.e., the rate at which the frequency decreases. Thus, the device 237 serves to connect or disconnect the power capacitors, not only in accordance with which polarity the frequency change rate has, but also in accordance with whether the frequency change rate has exceeded the threshold value.

(Operation and Advantages)

As has been described in explaining the nineteenth and twenty-third embodiments, the voltage-change reference ΔV* output from the function circuit 232 has the function of increasing the frequency change further. The frequency change is also increased by disconnecting the group 241 of capacitors.

The reference ΔV* and the disconnection of the group 241 are utilized in the same way as in the twenty-fourth embodiment. However, the power capacitors are not so frequently connected and disconnected. Rather, the frequency is changed by using the function circuit only. When the frequency change rate exceeds the threshold value, it is considered that the system has been disconnected from the power system. Then, the power capacitors are connected or disconnected. Hence, the frequency change that occurs during the isolated operation can be increased, from the value shown in FIG. 3 to the value shown in FIG. 29, without changing the reactive power frequently. An anomalous frequency or an excessive rate of frequency change can thereby be detected to detect the isolated operation easily.

(Twenty-Sixth Embodiment)

(Structure)

Figure 37:
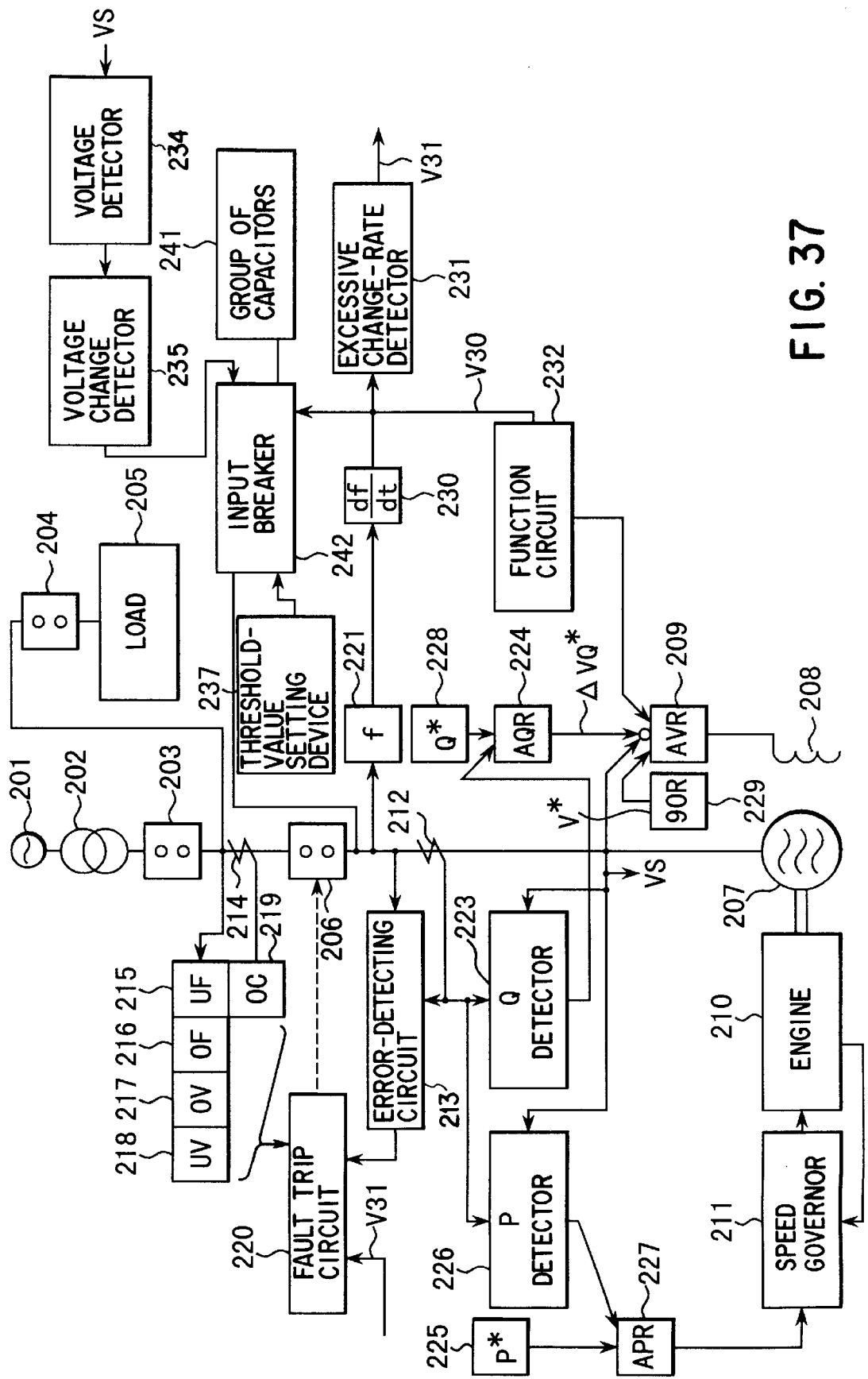
FIG. 37 is a block diagram illustrating an apparatus for protecting a non-utility generation system, which is a twenty-eighth embodiment of the invention.

FIG. 37 shows the twenty-sixth embodiment of the invention. The twenty-sixth embodiment differs from the nineteenth embodiment of FIG. 19 in three respects. First, no component equivalent to the second function circuit 233 is provided. Second, a group 241 of capacitors and an input breaker 242 are additionally provided. Third, a threshold-value setting device 237 is additionally provided to set a threshold value of the frequency change rate.

Figure 38:
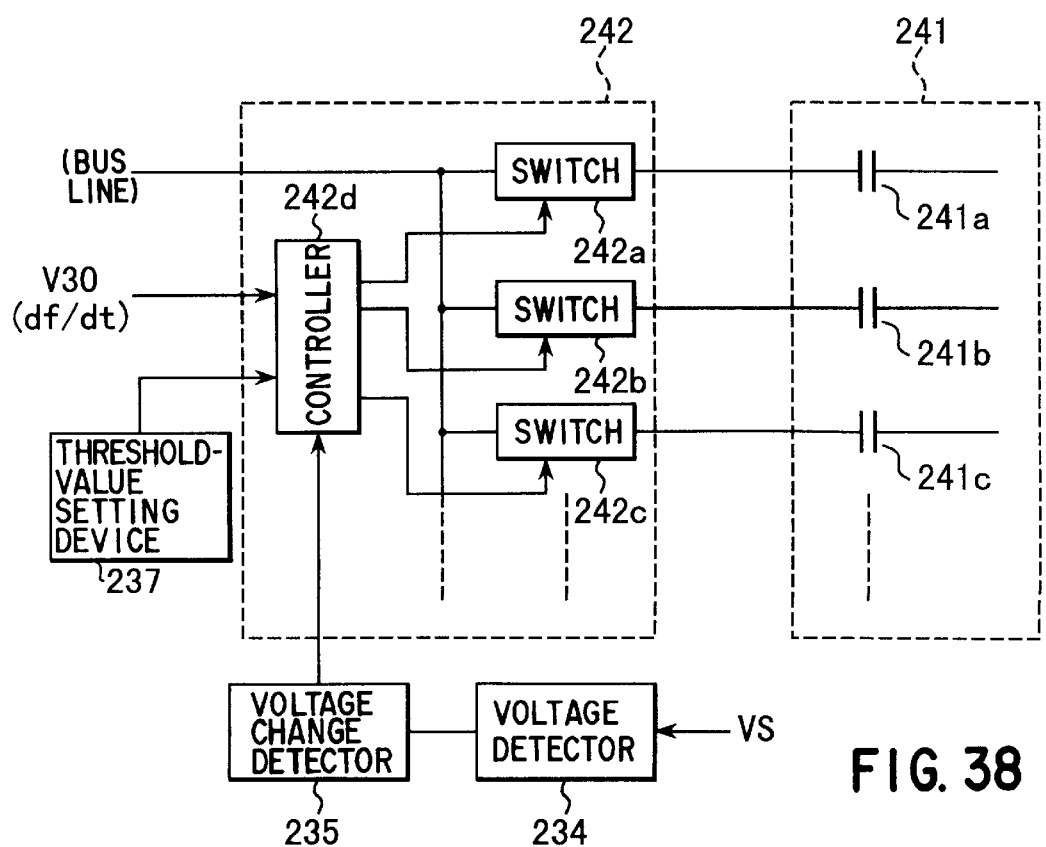
FIG. 38 is a diagram supplemental to the block diagram of the twenty-fourth embodiment of the invention.

As shown in FIG. 38, the threshold-value setting device 237 inputs a threshold value to the controller 232d provided in the input breaker 242, in the same way as in the twenty-fifth embodiment. The threshold value is compared with the frequency change, thereby to determine whether the power capacitors have been connected or disconnected. As shown in FIG. 38, the signal representing the voltage change and generated by the voltage detector 234 and the voltage change detector 235 is input to the controller 242d. This signal is used to determine whether the power capacitors have been connected or disconnected.

(Operation and Advantages)

As has been described in explaining the nineteenth and twenty-third embodiments, the voltage-change reference ΔV* output from the function circuit 232 has the function of increasing the frequency change further. The frequency change is also increased by disconnecting the group 241 of capacitors.

The reference ΔV* and the disconnection of the group 241 are utilized in the same way as in the twenty-fourth embodiment. However, the power capacitors are not so frequently connected and disconnected. Rather, the frequency is changed by using the function circuit only. Once the system is disconnected from the system power supply, the frequency increases as the voltage rises, and decreases as the voltage lowers. Hence, it the frequency changes in either way and if the frequency change rate exceeds the threshold value, it is detected that the system has been disconnected from the power system. Then, the power capacitors are connected or disconnected.

Therefore, the frequency change that occurs during the isolated operation can be increased, from the value shown in FIG. 27 to the value shown in FIG. 29, without changing the reactive power frequently. An anomalous frequency or an excessive rate of frequency change can thereby be detected to detect the isolated operation easily.

(Twenty-Seventh Embodiment)

The frequency will not change while the system remains connected, even if the power capacitors are connected or disconnected in order to increase the frequency change. Connection or disconnection of the power capacitors induces a change in the reactive power. This function of the power capacitors can be applied to the improve the power factor. If appropriately adjusted before the power capacitors are connected or disconnected in accordance with the frequency change rate, the power factor will have an undesirable value. If the frequency change cannot be increased, the system is considered to be connected, not performing isolated operation. In this case, the influence of the power capacitors either connected or disconnected is nullified, thereby changing the power factor back to a desirable value.

(Twenty-Eighth Embodiment)

In the description of the nineteenth to twenty-seventh embodiments, the revolving type generation system comprising the AC generator 207 and engine 210 has been mainly explained. Instead, either a static generation system comprising a DC power supply and an inverter or a reactive power generation system may be employed. Either generation system may be controlled to increase the advanced reactive power if the rate of the frequency change has a positive value, and to increase the delayed reactive power if the rate of the frequency change has a negative value. Then, the same advantages can be achieved as in any one of the twelfth to seventeenth embodiments.

Industrial Applicability

As has been described, the present invention can provide an apparatus for protecting a non-utility generation system, which has function circuits so designed to make it possible to detect the isolated operation of the generation system within a short time even if it is most difficult to detect it because neither active power nor reactive power is supplied to the system, which can maintain the reactive power change (voltage change) within an appropriate range while the generation system remains connected, and which can operate at high speed, in high stability and with high reliability even if a number of generators are operating or revolving type generators and static type generators are operating together.

Moreover, the present invention can provide an apparatus for protecting a non-utility generation system, which can reliably detects the isolated operation of the non-utility generation system connected to an upper substation by the interconnection system, without using a transfer breaker which is expensive.

What is claimed is:

1. An apparatus for protecting a non-utility generation system which is interconnected by a breaker to a power system and which has a voltage control system, said apparatus comprising:

a frequency detector for detecting an output frequency of the non-utility generation system;

a frequency-change rate detector for detecting a rate at which the frequency detected by the frequency detector changes;

arithmetic means for calculating a change reference for a voltage or reactive power output by the non-utility generation system, from the frequency change rate detected by the frequency-change rate detector;

first control means for increasing an advanced reactive power of the non-utility generation system or decreasing the output voltage of the non-utility generation system, when it is determined from the change reference that the frequency change rate has a positive value;

second control means for increasing a delayed reactive power of the non-utility generation system or increasing the output voltage of the non-utility generation system, when the frequency change rate has a negative value;

gain adjusting means for adjusting a gain of a power control section of the non-utility generation system, in accordance with the frequency change rate; and protecting means for detecting a frequency change which increases as the voltage of the non-utility generation system changes, and for disconnecting the non-utility generation system from the system bus line in accordance with the frequency change detected.

2. An apparatus according to claim 1, wherein the gain adjusting means has gain setting means for setting a gain in the power control section of the non-utility generation system, said gain being high when the frequency change rate falls in an extremely low range, being low when the frequency change rate falls in an intermediate range, and being a relatively high when the frequency change rate falls in a high range.

3. An apparatus according to claim 1, wherein the gain adjusting means has means for switching the gain of the power control section in accordance with the frequency change rate and/or switching a limited value corresponding to the change reference.

4. An apparatus according to claim 1, wherein the non-utility generation system comprises a revolving generation system.

5. An apparatus according to claim 1, wherein the non-utility generation system comprises a static generation system.

6. An apparatus for protecting a non-utility generation system which is interconnected by a breaker to a power system, said apparatus comprising:

a frequency change detector for detecting changes in an output frequency of the non-utility generation system;

control means for outputting a control signal to the non-utility generation system, thereby to control a reactive power, a preset output voltage, an output voltage, an output voltage phase or an output current phase of the non-utility generation system;

reactive power-change rate detector for detecting a rate at which a reactive power of the non-utility generation system changes;

voltage-change rate detecting means for detecting a rate at which an output-voltage reference of the non-utility generation system changes;

frequency-change increasing means for changing an output of the non-utility generation system, thereby to increase the frequency change, when the reactive power-change rate detecting means and the voltage-change rate detecting means detect a change in the frequency of the non-utility generation system; and operating mode setting means for setting an operating mode of the non-utility generation system when the reactive power-change rate decreases as the frequency-change increasing means increases the frequency change.

7. An apparatus according to claim 6, wherein the operating mode setting means has stop/disconnect means for stopping the non-utility generation system which gives a disconnection command to the breaker, or for disconnecting the non-utility generation system from the system bus line, when the frequency-change increasing means increases the frequency change, thereby decreasing the reactive power-change rate.

8. An apparatus according to claim 6, wherein the operating mode setting means comprises isolated operation means for disconnecting the non-utility generation system from the power system and turning off the frequency-change increasing means, thereby to cause the non-utility generation system to perform isolated operation, when the frequency-change increasing means increases the frequency change, thereby decreasing the reactive power-change rate.

9. An apparatus according to claim 6, wherein the non-utility generation system comprises a revolving generation system.

10. An apparatus according to claim 6, wherein the non-utility generation system comprises a static generation system.

11. An apparatus for protecting a non-utility generation system which is interconnected by a breaker to a power system and which has a voltage control system, said apparatus comprising:

a frequency detector for detecting an output frequency of the non-utility generation system;

a frequency-change rate detector for detecting a rate at which the frequency detected by the frequency detector changes;

low-speed response reactive power control means for detecting a reactive power of the non-utility generation system, said low-speed response reactive power control means being controlled by a first voltage reference to change the reactive power to a desired value;

high-speed response reactive power control means controlled by a reactive-power change reference and a second voltage change, said reactive-power change reference advancing the reactive power when said frequency-change rate detector detects that the frequency change rate has a positive value, and delaying the reactive power when said frequency-change rate detector detects that the frequency change rate has a negative value, and said second voltage change having been obtained by comparing the reactive power and the reactive power change;

voltage control means for controlling an output voltage of the non-utility generation system in accordance with a third voltage reference obtained from the first voltage reference for controlling the low-speed response reactive power control means and the second voltage reference for controlling the high-speed response reactive power control means; and protective means for disconnecting the non-utility generation system from a bus line in accordance with the reactive power change and also with the second voltage reference for controlling the high-speed response reactive power control means.

12. An apparatus according to claim 11, wherein the non-utility generation system comprises a revolving generation system.

13. An apparatus according to claim 11, wherein the non-utility generation system comprises a static generation system.

14. An apparatus according to claim 11, wherein the non-utility generation system comprises a static power converter having a circuit which delays the reactive power control or the voltage change control.

15. An apparatus according to claim 11, wherein the non-utility generation system comprises a static power converter having a circuit which delays the reactive power control or the voltage change control.

16. An apparatus for protecting a non-utility generation system which is interconnected a breaker to a power system, said apparatus comprising:

a frequency detector for detecting an output frequency of the non-utility generation system;

a frequency-change rate detector for detecting a rate at which the frequency detected by the frequency detector changes;

a function circuit for calculating a voltage-change reference from the frequency change rate detected by the frequency-change rate detector and for controlling the non-utility generation system to increase an advanced reactive power of the non-utility generation system or decrease the output voltage of the non-utility generation system when it is determined from the voltage change reference that the frequency change rate has a positive value, and to increase a delayed reactive power of the non-utility generation system or increase the output voltage of the non-utility generation system when it is determined from the voltage change reference that the frequency change rate has a negative value;

an active power detector for detecting an active power of the non-utility generation system;

voltage-change reference correcting means for increasing the voltage-change reference output from the function circuit, thereby to sufficiently increase the output frequency of the non-utility generation system when the active power detected by the active power detect or is small; and a protective device for detecting a frequency change increasing as the voltage of the non-utility generation system changes and for disconnecting the non-utility generation system from a bus line.

17. An apparatus according to claim 16, wherein the non-utility generation system comprises a section having a static DC power supply and a power converter.

18. An apparatus according to claim 16, wherein the non-utility generation system comprises a section having a static DC power supply and a device for compensating for reactive power.

19. An apparatus for protecting a non-utility generation system which is interconnected by a breaker to a power system, said apparatus comprising:

a frequency detector for detecting an output frequency of the non-utility generation system;

a frequency-change rate detector for detecting a rate at which the frequency detected by the frequency detector changes;

a group of capacitors which are power capacitors;

input breaker means for disconnecting the group of capacitors from the non-utility generation system when the frequency change rate detected by the frequency-change rate detector has a positive value and connecting the group of capacitors to the non-utility generation system when the frequency change rate detected by the frequency-change rate detector has a negative value; and a protective device for detecting a frequency change increased as the reactive power changes when the group of capacitors is connected or disconnected, and for disconnecting the non-utility generation system from a base line in accordance with the frequency change detected.

20. An apparatus according to claim 19, wherein the non-utility generation system comprises a section having a static DC power supply and a power converter.

21. An apparatus according to claim 19, wherein the non-utility generation system comprises a section having a static DC power supply and a device for compensating for reactive power.

22. An apparatus for protecting a non-utility generation system which is interconnected by a breaker to a power system, said apparatus comprising:

a frequency detector for detecting an output frequency of the non-utility generation system;

a frequency-change rate detector for detecting a rate at which the frequency detected by the frequency detector changes;

a function circuit for calculating a voltage-change reference from the frequency change rate detected by the frequency-change rate detector and for controlling the non-utility generation system to increase an advanced reactive power of the non-utility generation system or decrease the output voltage of the non-utility generation system when it is determined from the voltage change reference that the frequency change rate has a positive value, and to increase a delayed reactive power of the non-utility generation system or increase the output voltage of the non-utility generation system when it is determined from the voltage change reference that the frequency change rate has a negative value;

a group of capacitors which are power capacitors, input breaker means for disconnecting the group of capacitors from the non-utility generation system when the frequency change rate detected by the frequency-change rate detector has a positive value and connecting the group of capacitors to the non-utility generation system when the frequency change rate detected by the frequency-change rate detector has a negative value; and a protective device for detecting a frequency change increased as the reactive power changes when the group of capacitors is connected or disconnected, and for disconnecting the non-utility generation system from a base line in accordance with the frequency change detected.

23. An apparatus according to claim 22, wherein the group of capacitors is disconnected from the non-utility generation system when the frequency change rate has a positive value and exceeds a preset positive value, and is connected to the non-utility generation system when the frequency change rate has a negative value and exceeds a preset negative value.

24. An apparatus according to claim 22, wherein the non-utility generation system comprises a section having a static DC power supply and a power converter.

25. An apparatus according to claim 22, wherein the non-utility generation system comprises a section having a static DC power supply and a device for compensating for reactive power.

\* \* \* \* \*

UNITED STATES PATENT AND TRADEMARK OFFICE
CERTIFICATE OF CORRECTION

PATENT NO.   : 6,107,784
DATED        : August 22, 2000
INVENTOR(S)  : Shigeo Nomiya et al.

It is certified that error appears in the above-identified patent and that said Letters Patent is hereby corrected as shown below:

Column 30,
Line 26, "power detect or" should read -- power detector --.

Signed and Sealed this

Fourteenth Day of October, 2003

JAMES E. ROGAN
*Director of the United States Patent and Trademark Office*